United States Patent [19]

Kaye

[11] Patent Number: 5,388,419
[45] Date of Patent: Feb. 14, 1995

[54] STAGED COOLING DIRECT EXPANSION GEOTHERMAL HEAT PUMP

[75] Inventor: Glen A. Kaye, Petitcodiac, Canada

[73] Assignee: Maritime Geothermal Ltd., New Brunswick, Canada

[21] Appl. No.: 139,200

[22] Filed: Oct. 20, 1993

Related U.S. Application Data

[63] Continuation-in-part of Ser. No. 53,050, Apr. 23, 1993, Pat. No. 5,313,804.

[51] Int. Cl.⁶ .............................................. F25B 13/00
[52] U.S. Cl. ................................. 62/160; 62/196.4; 62/200; 62/260; 62/238.7; 62/324.6; 165/45
[58] Field of Search ............... 62/160, 199, 200, 260, 62/238.6, 238.7, 196.1, 196.3, 196.4, 197, 324.1, 324.6, 224, 225, 210, 212, 222; 165/45

[56] References Cited

U.S. PATENT DOCUMENTS

| | | | |
|---|---|---|---|
| 4,327,560 | 5/1982 | Leon et al. | 62/324.1 X |
| 4,753,285 | 6/1988 | Rawlings | 62/260 X |
| 4,878,357 | 11/1989 | Sekigami et al. | 62/160 |
| 4,920,757 | 5/1990 | Gazes et al. | 62/260 X |
| 5,025,634 | 6/1991 | Dressler | 62/238.6 X |
| 5,038,580 | 8/1991 | Hart | 62/324.6 |
| 5,136,855 | 8/1992 | Lenarduzzi | 62/260 X |

Primary Examiner—Harry B. Tanner
Attorney, Agent, or Firm—Eckert Seamans Cherin & Mellott

[57] ABSTRACT

A "DX" heat pump is provided herein which is based on the principle of providing optimal heat exchange in the heating mode through three parallel ground loops, two of which can be cut off from the system and evacuated of refrigerant in the cooling mode. The loops are designed in terms of volume so that the refrigerant charge is correct in the heating mode when split in three loops and also correct in the cooling mode when only one loop is used, but it contains the full system refrigerant charge. The loops are provided with "TX" metering valves which can be individually operated to provide a staged cooling system.

8 Claims, 9 Drawing Sheets

STAGED COOLING DIRECT EXPANSION GEOTHERMAL HEAT PUMP

BACKGROUND OF THE INVENTION (a) Related Inventions

This application is a continuation-in-part of application Ser. No. 08/053,050 filed Apr. 23, 1993, U.S. Pat. No. 5,313,804, the entire contents of which are incorporated by reference.

(b) Field of the Invention

This invention relates to a geothermal heat pump for residential or commercial use falling under the general category of what is known in the industry as a "direct expansion" heat pump, (hereinafter referred to as a "DX" heat pump).

(c) Description of the Prior Art

Conventional technology concerned with heat pumps relies upon the transfer of heat from the ground by means of a secondary working fluid, e.g., water, which is pumped to the geothermal unit located in the heated structure. The conventional heat pump has its own internal heat exchanger which extracts the heat (heating mode) from this water, which is then pumped back to the earth to be reheated.

Such geothermal heat exchange is an efficient and effective way of achieving heat exchange in heating and air conditioning systems, and especially heat pump type systems. Since the ground temperature is relative constant at about 48° F. at a depth below the frost line, the available heat is constant.

"DX" systems similarly use a ground coil system. However the working fluid is a refrigerant and the copper ground loop is the primary heat exchanger. A problem which has been associated with such systems is the means and manner in which the heat exchange coils, or outdoor coils, are placed into the ground to achieve geothermal heat exchange.

If the geothermal outdoor coils are placed into the ground in a vertical fashion, installation may be easily accomplished by drilling or boring holes into the ground, into which the vertical geothermal outdoor coils may be placed. The coils may quickly and easily be placed into the ground to a depth which is sufficient to overcome ground freezing problems associated with colder climates.

Heretofore, one reason why placing coils into the ground in a vertical fashion has not been workable was due to the fact that, when sufficient refrigerant was placed into the system to achieve maximum efficiency in both the heating and cooling cycles, the refrigerant, as it condensed in the ground coils, caused a liquid refrigerant build-up. The compressor was unable properly to move the refrigerant through the system when the liquid refrigerant settled within the ground coils, making the system unworkable. Damage to the compressor could occur when the compressor forced liquid refrigerant into the intake of the compressor, since compressors for such systems are designed for receiving and compressing gases.

Such problem associated with vertical outdoor geothermal coils was attempted to be solved by placing the coils into the ground in a horizontal fashion. Placing the coils into the ground in a horizontal fashion partially alleviated the problem of liquid refrigerant build-up. However, this technique required a vast amount of available ground to achieve the proper heat exchange, as well as the excavation of sufficient land to place enough ground coils to achieve sufficient heat exchange. In colder climates, this excavation must also be to a sufficient depth to place the coils for proper heat exchange. In short, placing the geothermal coils in a horizontal fashion was more difficult, expensive, and required much more available ground than does placing of the coils into vertical holes.

It has also been common practice to provide heat pump systems which included means for reversing the direction of flow of refrigerant from the compressor through two heat exchangers so that the functions of the heat exchangers were reversed. Thus, one of the heat exchangers was adapted to heat or cool the air of a room, for example, according to the direction of flow of refrigerant. When the direction of flow of refrigerant was reversed, it was necessary to alter the degree of restriction between the two heat exchangers to provide for proper operation of the system in the alternative function. Altering the degree of restriction relative to the direction of flow of refrigerant was necessary since a system optimized for cooling generally had insufficient restriction to provide optimum performance when operated to supply heat. That is, in a system optimized for cooling, the compressor normally circulated refrigerant through the evaporator faster than the surface could evaporate the refrigerant when the system was operated in the heating cycle. The compressor, in the heating cycle, then pumped unevaporated refrigerant and the system efficiency was low. To overcome this problem, variable restriction systems, using a "TX" or thermostatic expansion valve, have been employed in such heat pump systems. In many instances, two restrictors have been provided together with parallel valve systems, each of which was adapted to function in accordance with the direction of refrigerant flow.

A direct earth coupled heat pump was one that had its refrigerant evaporator/condenser in direct thermal contact with the earth from which heat was either extracted from in the heating mode or is introduced to in the cooling mode of operation. Many attempts have been made in the past to develop successful direct coupled heat pumps for residential and commercial uses. These attempts have failed adequately to meet a number of requirements associated with an economically and functionally viable system. Some of the shortcomings included: inadequate oil return to the compressor primarily in the heating mode; inadequate evaporator length and spacing for properly extracting heat from the earth resulting in low capacity and low efficiency of the systems; lack of a proper means to store additional refrigerant required during the cooling operation, but not needed during the heating mode; lack of volume control of the compressor for providing the necessary increase in displacement during the heating operation over that displacement needed for the cooling operation. This lack of displacement control resulted in insufficient heating capacity during the coldest weather.

U.S. Pat. No. 4,920,757 patented May 1, 1990 by J. Gazes et al attempted to provide a solution to overcome the problems associated with heat exchange with the outside air, water and geothermal means which have been employed for heat exchange. The patented solution was the provision of a geothermal heating and air conditioning system which included a compressor for compressing a refrigerant, and one or more indoor coils for heat exchange between the refrigerant and inside air. One or more outdoor coils were placed vertically below ground for heat exchange between the refrigerant and earth surrounding the outdoor coils. A condenser/receiver allowed the refrigerant to pass through the condenser/receiver in either direction, and was positioned between the indoor coil and the ground coils, allowing for heat exchange so as to control the state and temperature of the refrigerant. The condenser/receiver had sufficient volume capacity to accumulate liquid refrigerant to prevent liquid refrigerant from entering the compressor. A portion of the refrigerant travelling between the indoor coils and the outdoor coils was diverted to an inlet side of the compressor. A valve controlled a flow of refrigerant in response to refrigerant pressure on the inlet side of the compressor.

U.S. Pat. No. 5,038,580 patented Aug. 13, 1991 by D. P. Hart attempted to provide a solution to problems associated with heat pumps having direct earth coupled heat exchangers. The patented improvement provided a heat pump system having a sub-surface heat exchanger which used a heat exchanging fluid existing in gaseous and liquid form. The heat pump system included a compressor for compressing the heat exchanging fluid. A four-way reversing valve for directing the flow of the heat exchanging fluid was functionally connected to the compressor. An indoor heat exchange coil, functionally connected to the four-way reversing valve, was provided for transferring heat to or from the interior of a building. An accumulator, also functionally connected to the four-way reversing valve, was provided for trapping and storing liquids within the apparatus. A plurality of sub-surface tapered heat exchanger tubes were functionally connected to the four-way reversing valve. A hi-directional balanced expansion valve was functionally connected to the sub-surface heat exchanger. A receiver was provided for storing excess fluid functionally connected to the expansion valve and to the indoor heat exchange coil.

U.S. Pat. No. 4,327,560 patented May 4, 1982 by H. I. Leon et al, provided an earth-embedded heat pump system. That patent provided a system for transferring heat from the earth to a conditioned space wherein the heat transfer fluid was circulated in a substantially closed loop through an earth coil. Sections of the coil were jacketed with one or more hermetically-sealed enclosures which were adapted to be charged with a composition which, upon crystallization, released latent heat. The transition temperature at which the latent heat was released and the rate at which the latent heat was released to the heat transfer fluid was said to stabilize its temperature within a range which provided for an inlet condition to a water-to-air heat pump which was favourable to a high heat output from the heat pump system per unit energy input.

In U.S. Pat. No. 4,437,583 patented Mar. 8, 1983 by J. E. Downy, Jr., a complete system was disclosed for providing space heating and cooling, for an indoor living space which brought the heat from the geothermal storage capacity, (the earth), to the indoor living space during the heating season and extracted heat from the indoor living space and absorbed the heat into storage during the cooling season. In the patented system, a relatively massive thermal storage unit was interposed between the geothermal storage capacity, (the earth), and the indoor living space environment which was to be heated or cooled. A working fluid, e.g., water, was circulated between the massive thermal storage unit, and the geothermal storage capacity, (the earth). A heat pump was operatively connected between the massive thermal storage unit and the indoor living space environment. In addition, the working fluid, was circulated between heat exchangers, one of which was located in the massive thermal storage unit in contact with the working fluid therein and the second of which was located in the indoor living space environment.

U.S. Pat. No. 4,445,343 patented May 1, 1984 by W. J. McCarty provided a heat pump system comprising a compressor and two heat exchangers connected in a refrigerating circuit. Such refrigerating circuit was provided with refrigerant flow restricting means between the heat exchangers. Such restricting means imported relatively high restriction to the flow of refrigerant between the heat exchangers in one direction and a relatively lower restriction to the flow of refrigerant between the heat exchangers in the opposite direction.

U.S. Pat. No. 4,646,538 patented March 3, 1987 by A. J. Blackshaw et al provided a heat pump system which had the capability of both space heating and cooling and which used the minimum number of components while at the same time permitting any two heat exchangers in the system to be used without involving the other heat exchanger so that any heat exchanger not being used in a particular mode could be bypassed. Further, those portions of the system not being utilized in any mode remained connected to the suction side of the compressor to depressurize that portion of the system. Liquid traps prevented the undesired build-up of refrigerant in that portion of the system not being currently used. The system design was said to permit the various operational modes by using only one additional externally controlled valve over that associated with a heat pump system used only to space heat and cool with the rest of the additional components used to interconnect the system being operated without any external control force.

The patented apparatus included a refrigerant pressurizing means whose high pressure outlet was connected to the input of a three-way valve. One output of the three-way valve was connected to the common input of a four-way valve. The common output of the four-way valve was connected to the suction side of the refrigerant pressurizing means. One of the reversible outlet ports on the four-way valve was connected to a space heat exchanger while the other reversible outlet port on the four-way valve was connected to a source heat exchanger. The opposite sides of the space and source heat exchangers were connected to each other through a reversible expansion device. The other output of the three-way valve was connected to an alternate heat exchanger. The other side of the alternate heat exchanger was connected to an alternate expansion device. The other side of the alternate expansion device was connected to the common point between the reversible expansion device and the space heat exchanger through a check valve allowing refrigerant to flow from the alternate heat exchanger to the space heat exchanger through a check valve. The other side of the alternate expansion device was also connected to the common point between the reversible expansion device and the source heat exchanger so that refrigerant could flow from the alternate heat exchanger to the source heat exchanger through a check valve.

As is evident from the above discussion, the general refrigeration cycle of a "DX" heat pump is similar to a conventional water-to-air or water-to-water heat pump in that it includes a compressor, an expansion device, a reversing valve, and a refrigerant-to-air heat exchanger.

The unit functions as both a heating and cooling device and also generates domestic hot water. The "DX" heat pumps differ from conventional geothermal liquid source heat pumps in that the heat exchanger which transfers heat to and from the earth is an external part of the unit and is embedded directly in the earth in either a horizontal or vertical configuration. A "DX" machine takes the heat exchanger directly to the source of heat (the earth) while a conventional unit with a self-contained heat exchanger relies on having a fluid containing heat pumped to it for extraction. The heat pump and exchanger comprise one integral unit.

SUMMARY OF THE INVENTION (a) Aims of the invention

In spite of these purported solutions to such problems the art has not yet solved the problem of providing a "DX" geothermal heat pump which solves the engineering obstacles, and in particular, the refrigerant imbalance and oil return problems that have prevented the widespread general acceptance of this type of product in the industry. Widespread use of "DX" heat pumps has been hindered by several factors: vastly different demands put on the earth heat exchanger during heating and cooling modes; difficulty in maintaining oil return in the refrigeration system; difficulty in providing an easy-to-install system of earth heat exchanger loops; and refrigerant charges in the range of 10 times greater than a similar capacity conventional geothermal heat pump.

For heat to be absorbed from the ground, it is necessary to create a temperature differential ("TD") between the ground and the refrigerant inside the heat exchanger. Heat is absorbed from the ground when the refrigerant undergoes a change of state from a liquid to a gas as result of exposure to the warm earth. It is important that the heat exchanger be as large as possible to maintain the smallest TD between the earth and the refrigerant. By maintaining the highest refrigerant temperature the highest refrigerant pressure is also maintained in the earth exchanger or evaporator (as it is called during the heating mode of the heat pump). This insures that the compressor receives the most dense charge at its suction inlet and thus operates at the highest volumetric efficiency.

The inhibiting engineering factor in arbitrarily sizing the earth exchanger piping to any diameter and length is that a minimum velocity of the refrigerant gas must be maintained to entrain or sweep the compressor lubricating oil back to the machine at all times. Another factor which is important in "DX" heat pump systems is that whatever configuration of tubing underground that is used as an evaporator in the heating mode is typically used as a condenser in the cooling mode of the heat pump.

During the cooling cycle of a "DX" heat pump the problem exists of a much smaller earth heat exchanger being required to reject heat to the earth. Typically the discharge gas temperature is from about 175° F. to about 200° F. and actual condensing temperature may be about 110° F. From an engineering standpoint, a large "TD" is encountered between the hot gas temperature and the earth. The temperature difference would indicate that only about 15 to 20% of the surface area would be required to handle this heat of rejection under such circumstances. When a typical system has been sized and charged with enough refrigerant to operate correctly in the heating mode and then is reversed to the cooling mode, the compressor will merely pump all the refrigerant to the earth coils where it will stay because the compressor is unable to create enough pressure to overcome the pressure drop in the liquid line, "TX" valve and internal evaporator. The refrigeration cycle is effectively stopped since the compressor will go into a vacuum position on the suction side and shut off on internal safety devices.

To solve this problem it has been proposed by others to disable the heat exchange capabilities of the earth coil now operating as a condenser coil by filling it with refrigerant until it is approximately 75% full of liquid refrigerant. Under these circumstances, the compressor is able to build up enough discharge pressure to force liquid back to the evaporator and the refrigeration cycle can proceed. In solving the refrigerant flow problem in this manner, however, several very negative circumstances are created, namely: approximately three times as much refrigerant is required in the cooling mode as is required in the heating mode, i.e. typically about 50 to about 60 lbs. for a well designed 3-4 ton system; a large refrigerant storage tank (called a receiver) must be employed to store the refrigerant not used during the cooling mode; a similarly-sized accumulator must be installed to catch the inrush of liquid during the switch-over from cooling to heating so that the compressor will not be damaged; and the machine suffers very poor performance (COP) during switch-over from heating to cooling while the refrigerant is being positioned into or out of the receiver as required for the mode change.

Many of the above problems have been solved by the teaching of the above-identified patent application Ser. No. 08/053,050 filed Apr. 23, 1993, of which the present application is a continuation-in-part. The above-identified patent application Ser. No. 08/053,050 filed Apr. 23, 1993 provided, in a broad generic mode, a loop system for use in combination with a "DX" heat pump system, the loop system comprising: three loops, a first loop including a dual purpose suction/hot gas line and a liquid line, and the second and third loops each including a suction line and a liquid line, each loop being adapted to be buried underground in heat exchange relationship with the earth; a refrigerant vapor header provided with a check valve; means connecting the suction/hot gas line of the first loop to the suction header downstream of the check valve; means connecting the suction lines of each of the two other loops to the refrigerant vapor header upstream of the check valve; a liquid line header provided with an electric solenoid valve; means connecting the liquid line of the first loop to the liquid line header upstream of the electric solenoid valve; and means connecting the liquid lines of each of the other two loops to the liquid line header downstream of the electric solenoid valve.

The above-identified patent application Ser. No. 08/053,050 filed Apr. 23, 1993 also provided a first mode of a first embodiment of a "DX" heat pump system in the heating mode, in which the system comprised: three earth loops, a first earth loop including a suction line and a liquid line, each loop being adapted to be buried underground in heat exchange relationship with the earth; a refrigerant vapor header provided with a check valve; means connecting the suction line of a first loop to the refrigerant vapor header downstream of the check valve; means connecting the suction lines of each of the two other loops to the refrigerant vapor header upstream of the check valve; a liquid line header provided with an electric solenoid valve; means connecting the liquid line of the first loop to the liquid line header upstream of the electric solenoid valve; means connecting the liquid lines of each of the other two loops to the liquid line header downstream of the electric solenoid valve; a scavenging line connected between the refrigerant vapor header upstream of the check valve and an accumulator; a liquid line provided with a "TX" valve connected to the liquid line header; a reversing valve having two inlets and two outlets; a compressor having an inlet and an outlet, the outlet being connected to the hot gas inlet of the reversing valve; an accumulator having an inlet and an outlet, the outlet being connected to the inlet of the compressor; the hot gas outlet of the reversing valve being connected to the inlet of an air condenser; a common suction outlet of the reversing valve being connected to the inlet of the accumulator; and the suction inlet of the reversing valve being connected to the refrigerant vapor header downstream of the check valve.

The above-identified patent application Ser. No. 08/053,050 filed Apr. 23, 1993 also provided a second mode of a first embodiment of a "DX" heat pump system in the cooling mode, in which the "DX" heat pump system comprised: three earth loops, a first loop including a first loop including a hot gas line and a liquid line, and the second or third loops including a suction line and a liquid line, which are operationally idle during such cooling mode, each loop being adapted to be buried underground in heat exchange relationship with the earth; a refrigerant vapor header provided with a check valve; means connecting the hot gas line of a first loop to the refrigerant vapor header downstream of the check valve; means connecting the idle suction lines of each of the two other loops to the refrigerant vapor header upstream of the check valve; a liquid line header provided with an electric solenoid valve; means connecting the liquid line of the first loop to the liquid line header upstream of the electric solenoid valve; means connecting the idle liquid lines of each of the other two loops to the liquid line header downstream of the electric solenoid valve; a scavenging line connected between the refrigerant vapor upstream of the check valve and an accumulator; a liquid line provided with a "TX" valve connected to the liquid line header; a reversing valve having two inlets and two outlets; a compressor having an inlet and an outlet, the outlet being connected to the hot gas inlet of the reversing valve; an accumulator having an inlet and an outlet, the outlet being connected to the inlet of the compressor; the suction inlet of the reversing valve being connected to the outlet of an air evaporator; the suction outlet of the reversing valve being connected to the inlet of the accumulator; and the hot gas outlet of the reversing valve being connected to the refrigerant vapor header downstream of the check valve.

The above-identified patent application Ser. No. 08/053,050 filed Apr. 23, 1993 also provided a first mode of a second embodiment of a capillary-balanced feed "DX" heat pump system in the heating mode, in which the system comprised: three earth loops, a first loop including a dual purpose refrigerant vapor line and a liquid line, and the second and third loops which are operationally idle during the cooling mode, including a suction line and a liquid line each being adapted to be buried underground in a heat exchange relationship with the earth, a refrigerant vapor header provided with a check valve, means for connecting the refrigerant vapor line of the first loop to the refrigerant vapor header downstream of the check valve, means for connecting the suction lines of each of the other two loops to the refrigerant vapor header upstream of the check valve, a liquid line header provided with an electric solenoid valve, a bypass liquid line check valve in parallel with a first capillary tube whose inlet is connected to the first earth loop liquid line near the outlet of the first capillary tube and whose outlet is connected to the liquid line header upstream of the solenoid valve, three capillary tube restriction devices to provide balanced refrigerant metering in the heating mode, each capillary tube having one inlet and one outlet, a thermostatic expansion valve to act as the primary refrigerant metering device having one inlet and one outlet, an equalization port and a gas-filled controlling bulb, means for connecting the equalization tube of the thermostatic expansion valve to the common suction outlet of the reversing valve, means for placing the thermostatic expansion valve controlling bulb in thermal contact with the common suction outlet of the reversing valve, means for connecting the inlet of the first capillary tube to the liquid line header upstream of the solenoid valve, means for connecting the outlet of the first capillary to the liquid line of the first earth loop, means for connecting the inlet ports of the second and third capillary tubes to the liquid line header downstream of the solenoid valve, means of connecting the outlets of the second and third capillary tubes to the liquid lines of the second and third earth loops, respectively, a scavenging line connected between the refrigerant vapor header upstream of the check valve and the inlet of the accumulator, a reversing valve having two inlets and two outlets, a compressor having an inlet and an outlet, the outlet being connected to the hot gas inlet of the reversing valve, an accumulator having in inlet and an outlet, the outlet being connected to the inlet of the compressor, the hot gas outlet of the reversing valve being connected to the inlet of the condenser coil, and the suction inlet of the reversing valve being connected to the refrigerant vapor header downstream of the check valve.

The above-identified patent application Ser. No. 08/053,050 filed Apr. 23, 1993 also provided a second embodiment of a capillary-balanced feed "DX" heat pump system in the cooling mode, in which the "DX" heat pump system comprised: a three earth loops, a first loop including a dual purpose refrigerant vapor line and a liquid line, and the second and third loops which are operationally idle during the cooling mode, including a suction line and a liquid line each being adapted to be buried underground in a heat exchange relationship with the earth, a refrigerant vapor header provided with a check valve, means for connecting the refrigerant vapor line of the first loop to the refrigerant header downstream of the check valve, means for connecting the idle suction lines of each of the other two loops to the refrigerant vapor header upstream of the check valve, a liquid line header provided with an electric solenoid valve, a bypass liquid line check valve in parallel with a first capillary tube whose inlet is connected to the first earth loop liquid line near the outlet of the first capillary tube and whose outlet is connected to the liquid line header upstream of the solenoid valve, three capillary tube restriction devices to provide balanced refrigerant metering in the heating mode, each capillary tube having one inlet and one outlet, a thermostatic expansion valve to act as the primary refrigerant metering device having one inlet and one outlet, an equalization port and a gas-filled controlling bulb, means for installing a capillary tube bypass between the inlet and outlet of the thermostatic expansion valve, means for connecting the equalization tube of the thermostatic expansion valve to the common suction outlet of the reversing valve, means for placing the thermostatic expansion valve controlling bulb in thermal contact with the common suction outlet of the reversing valve, means for connecting the inlet of the first capillary tube to the liquid line header upstream of the solenoid valve, means for connecting the outlet of the first capillary tube to the liquid line of the first earth loop, means for connecting the inlet ports of the second and third capillary tubes to the liquid line header downstream of the solenoid valve, means for connecting the outlets of the second and third capillary tubes to the liquid lines of the second and third earth loops, respectively, a scavenging line connected between the refrigerant vapor header upstream of the check valve and the inlet of the accumulator, a reversing valve having two inlets and two outlets, a compressor having an inlet and an outlet, the outlet being connected to the hot gas inlet of the reversing valve, an accumulator having an inlet and an outlet, the outlet being connected to the inlet of the compressor, the hot gas outlet of the reversing valve being connected to the refrigerant vapor header and thence to the hot gas inlet of the first ground loop, the common suction outlet of the reversing valve being connected to the inlet of the accumulator, and the suction inlet of the reversing valve being connected to the refrigerant vapor outlet of the air evaporator coil.

The above-identified patent application Ser. No. 08/053,050 filed Apr. 23, 1993 also provided a first mode of a third embodiment of an individual "TX" valve metering "DX" heat pump system in the heating mode, in which the "DX" heat pump system comprised: three earth loops, a first loop including a suction/hot gas line and liquid line, and the second and third loops including a suction line and a liquid line each being adapted to be buried underground in a heat exchange relationship with the earth, a refrigerant vapor header provided with a check valve, means for connecting the suction/hot gas line of the first loop to the refrigerant header downstream of the check valve, means for connecting the suction lines of each of the other two loops to the refrigerant vapor header upstream of the check valve, a liquid line header provided with an electric solenoid valve, three thermostatic expansion valves to provide refrigerant metering in the heating mode, each valve having one inlet and one outlet, an equalization port and a gas-filled controlling bulb, one thermostatic expansion valve to provide refrigerant metering in the cooling mode having one inlet and one outlet, an equalization port and a gas-filled controlling bulb, means for installing a capillary tube bypass between the inlet and outlet of the heating thermostatic expansion valves, means for connecting the inlet line of one heating thermostatic expansion valve to the liquid line header upstream of the solenoid valve, means for connecting the outlet of the thermostatic expansion valve to the liquid line of the first earth loop, means for connecting the equalization tube of the thermostatic expansion valve to the refrigerant vapor header downstream of the check valve, means for placing the thermostatic expansion valve controlling bulb in thermal contact with the refrigerant vapor line of the first loop a short distance from its connection to refrigerant vapor header, means of connecting the inlet ports of the second and third heating thermostatic expansion valves to the liquid line header downstream of the solenoid valve, means for connecting the outlet ports of the second and third thermostatic expansion valves to the liquid lines of the second and third earth loops respectively, means for connecting the equalization ports of the second and third thermostatic expansion valves to the refrigerant vapor header downstream of the check valve, means for placing the controlling bulbs of the second and third thermostatic expansion valves in thermal contact with the suction lines of the second and third earth loops respectively, a short distance from their connection to the refrigerant vapor header, means for connecting the inlet port of the cooling thermostatic expansion valve to the liquid line of the first earth loop downstream of the outlet of the heating thermostatic expansion valve and capillary bypass tube, means for connecting the outlet port of the cooling thermostatic expansion valve to the liquid line header upstream of the solenoid valve, means of connecting the equalizer line of the cooling thermostatic expansion valve to the refrigerant vapor line of the air/refrigerant heat exchanger coil a short distance from the outlet of the coil, means for placing the controller bulb of the cooling thermostatic expansion valve in thermal contact with the refrigerant vapor line of the air/refrigerant heat exchanger coil a short distance from the outlet of the coil, a scavenging line connected between the refrigerant vapor header upstream of the check valve and the accumulator, a reversing valve having two inlets and two outlets, a compressor having an inlet and an outlet, the outlet being connected to the hot gas inlet of the reversing valve, an accumulator having an inlet and an outlet, the outlet being connected to the inlet of the compressor, the got gas outlet of the reversing valve being connected to the inlet of the air condenser, the common suction outlet of the reversing valve being connected to the inlet of the accumulator, and the suction inlet of the reversing valve being connected to the refrigerant vapor header downstream of the check valve.

The above-identified patent application Ser. No. 08/053,050 filed Apr. 23, 1993 also provided a second mode of an individual "TX" valve metering "DX" heat pump system in the cooling mode, in which the "DX" heat pump system comprised: three earth loops, a first loop including a hot gas line and a liquid line, and the second and third loops including a suction line and a liquid line, which are operationally idle during such cooling mode, each loop being adapted to be buried underground in heat exchange relationship with the earth, a refrigerant vapor header provided with a check valve, means for connecting the refrigerant vapor line of the first loop to the refrigerant vapor header downstream of .the check valve, means for connecting the suction lines of each of the other two loops to the refrigerant vapor header upstream of the check valve, a liquid line header provided with an electric solenoid valve, three thermostatic expansion valves to provide a refrigerant metering in the heating mode, each valve having one inlet and one outlet, an equalization port and a gas-filled controlling bulb, one thermostatic expansion valve to provide refrigerant metering in the cooling mode having one inlet and one outlet, an equalization port and a gas-filled controlling bulb, means for installing a capillary tube bypass between the inlet and outlet of the heating thermostatic expansion valves, means for connecting the inlet line of one heating thermostatic expansion valve to the liquid line header upstream of the solenoid valve, means for connecting the outlet of the first heating thermostatic expansion valve to the liquid line of the first earth loop, means for connecting the equalization tube of the thermostatic expansion valve to the refrigerant vapor header downstream of the check valve, means for placing the thermostatic expansion valve controlling bulb in thermal contact with the refrigerant vapor line of the first loop a short distance from its connection to the refrigerant vapor header, means for connecting the inlet ports of the second and third heating thermostatic expansion valves to the liquid line header downstream of the solenoid valve, means for connecting the outlet ports of the second and third thermostatic expansion valves to the liquid lines of the second and third earth loops respectively, means for connecting the equalization ports of the second and third valves to the refrigerant vapor header downstream of the check valve means for placing the thermostatic expansion valve controlling bulbs of the second and third valves in thermal contact with the suction lines of the second and third earth loops respectively a short distance from their connection to the refrigerant vapor header, means for connecting the inlet port of the cooling thermostatic expansion valve to the liquid line of the first earth loop downstream of the outlet to the heating thermostatic expansion valve and capillary bypass tube means for connecting the outlet port of the cooling thermostatic expansion valve to the liquid line header upstream of the solenoid valve, means for connecting the equalizer line of the cooling thermostatic expansion valve to the refrigerant vapor line of the air/refrigerant heat exchanger coil a short distance from the outlet of the coil, means for placing the controller bulb of the cooling thermostatic expansion valve on the refrigerant vapor line of the air/refrigerant heat exchanger coil a short distance from the outlet of the coil, a scavenging line connected between the refrigerant vapor header upstream of the check valve and extending to the inlet of the accumulator, a reversing valve having two inlets and two outlets, a compressor having an inlet and an outlet, the outlet being connected to the hot gas inlet of the reversing valve, an accumulator having an inlet and an outlet, the outlet being connected to the inlet of the compressor, the hot gas outlet of the reversing valve being connected to the refrigerant vapor header and thence to the hot gas inlet of the first ground loop the common suction outlet of the reversing valve being connected to the inlet of the accumulator, and the suction inlet of the reversing valve being connected to the refrigerant vapor outlet of the air evaporator coil.

The above-identified patent application Ser. No. 08/053,050 filed Apr. 23, 1993 also provided a first mode of operating a first mode of a "DX" heat pump system in the heating mode, in which the method comprised the steps of: (i) opening the liquid line solenoid; (ii) allowing the "TX" valve to meter liquid refrigerant to the liquid line header as per the signal of the controller bulb; (iii) allowing liquid refrigerant to flow down the liquid lines; (iv) allowing vaporized refrigerant to flow upwardly in each of the suction lines and the refrigerant vapor header, through the reversing valve and thence to the accumulator and then the compressor; (v) flowing compressed refrigerant gas from the compressor through the reversing valve to the air condenser; and (vi) withdrawing liquid refrigerant from the air condenser through an outlet towards the liquid line, thermostatic expansion valve and liquid line header.

The above-identified patent application Ser. No. 08/053,050 filed Apr. 23, 1993 also provided a second mode of operating a "DX" heat pump system, in the cooling mode, in which the method comprised the steps of: (i) closing the solenoid valve, thereby preventing liquid refrigerant from entering the two loops which are upstream of the solenoid valve; (ii) high pressure hot discharge gas closes the check valve to assure that warmed refrigerant gas in refrigerant vapor header enters only the suction/hot gas line which is downstream of the valve; (iii) scavenging residual liquid refrigerant from the liquid refrigerant lines which are upstream of the solenoid valve to the accumulator and then to the compressor; (iv) passing compressed refrigerant through the reversing valve and into the suction hot gas line which is downstream of the check valve; (v) allowing the heat pump to reject its heat to the ground at a pressure which is high enough to force liquid refrigerant through the liquid refrigerant line connected to the liquid refrigerant header downstream of the solenoid valve; (vi) passing liquid refrigerant through the expansion valve and into the air evaporator; and (vii) withdrawing warmed refrigerant gas from the air evaporator into the suction line and through the reversing valve to the accumulator.

The above-identified patent application Ser. No. 08/053,050 filed Apr. 23, 1993 also provided a first mode of operating a capillary-balanced feed "DX" heat pump in the heating mode, in which the method comprised the steps of: (i) opening the liquid line solenoid valve, (ii) maintaining the bypass check valve around the first capillary tube closed by high pressure liquid (iii) allowing the thermostatic expansion valve to meter liquid refrigerant to the liquid line header as per the signal of the controller bulb; (iv) allowing the capillary tubes to restrict the flow slightly so that equal pressure is maintained on the inlet side of each capillary tube; (v) allowing liquid refrigerant to flow down the liquid lines (vi) allowing vaporized refrigerant to flow upwardly in each of the suction lines and the refrigerant vapor header through the reversing valve and thence to the accumulator and to the compressor, (vii) flowing compressed refrigerant gas from the compressor through the reversing valve to the air condenser, and (viii) withdrawing liquid refrigerant from the air condenser through a liquid line towards the liquid line, thermostatic expansion valve and liquid line header.

The above-identified patent application Ser. No. 08/053,050 filed Apr. 23, 1993 also provided a second mode of operating a capillary-balanced feed "DX" heat pump in the cooling mode, in which the method comprised the steps of: (i) closing the liquid line solenoid valve; (ii) maintaining the bypass check valve around the first capillary tube open by high pressure liquid; (iii) evaporating and scavenging residual liquid refrigerant from idle second and third suction lines into the accumulator and thence to the compressor, (iv) passing compressed refrigerant through the reversing valve and into the hot gas line which is downstream of the check valve on the refrigerant vapor header, (v) allowing the heat pump to reject its heat to the ground at a pressure which is high enough to force liquid refrigerant up the liquid line, (vi) allowing the liquid refrigerant to flow through the liquid line check valve and capillary tube on the first ground loop, to the thermostatic expansion valve inlet, (vii) allowing the thermostatic expansion valve to meter liquid refrigerant to the air coil evaporator as per the signal of the controller bulb, and (viii) withdrawing warmed refrigerant gas from the air evaporator into the suction line and through the reversing valve into the accumulator and thence to the compressor suction inlet.

The above-identified patent application Ser. No. 08/053,050 filed Apr. 23, 1993 also provided a first mode of operating an individual "TX" valve metering "DX" heat pump in the heating mode, in which the method comprised the steps of: (i) opening the liquid line solenoid valve; (ii) maintaining the cooling thermostatic expansion valve closed by virtue of its equalizer tube being connected to the refrigerant vapor port of the air coil which is under high pressure during the heating mode; (iii) allowing the liquid refrigerant to flow into the liquid line header; (iv) allowing the heating thermostatic expansion valves to meter liquid refrigerant down each of the three earth loops as per the signal of the respective controller bulbs; (v) allowing the vaporized refrigerant to flow upwardly in each of the suction lines and the refrigerant vapor header through the reversing valve and thence to the accumulator and to the compressor; (vi) flowing compressed refrigerant gas from the compressor through the reversing valve to the air condenser and; (vii) withdrawing liquid refrigerant from the air condenser through a liquid line towards the liquid line header.

The above-identified patent application Ser. No. 08/053,050 filed Apr. 23, 1993 also provided a second mode of operating an individual "TX" valve metering "DX" heat pump system in the cooling-mode, in which the method comprised the steps of: (i) closing the solenoid valve, thereby preventing liquid refrigerant from entering the two loops which are downstream of the solenoid valve; (ii) maintaining the refrigerant vapor header check valve closed by hot high pressure gas, whereby the got gas is directed only to the first ground loop; (iii) maintaining the three heating thermostatic expansion valves closed as a result of their equalizer tubes being connected to the currently high pressure refrigerant vapor line downstream of the check valve; (iv) evaporating and scavenging residual liquid refrigerant from the liquid refrigerant lines which are downstream of the solenoid valve to the accumulator and then to the compressor; (v) passing compressed refrigerant through the reversing valve and into the refrigerant vapor line which is downstream of the check valve; (vi) allowing the heat pump to reject it heat to the ground at a pressure which is high enough to force liquid refrigerant through the liquid refrigerant line connected to the inlet port of the cooling thermostatic expansion valve and the closed outlet port of the heating thermostatic expansion valve; (vii) allowing the cooling thermostatic expansion valve to meter the correct amount of liquid refrigerant into the air evaporator by virtue of the placement of its controlling bulb and equalizer tube a short distance from the refrigerant vapor outlet and (viii) withdrawing warmed refrigerant gas from the air evaporator into the suction line and through the reversing valve into the accumulator and thence to the compressor suction inlet.

An object therefore of the present invention is to provide an improved "DX" heat pump in the type provided in the above-identified patent application Ser. No. 08/053,050 filed Apr. 23, 1993, for installation in various locations with diverse soil types using either vertical or horizontal evaporator/condenser coils in the earth, while having the heat pump operate efficiently as possible both in the heating mode or in the cooling mode, in which a "TX" valve may be used for metering for staged cooling.

(b) Statement of Invention

The present invention, in broad terms, provides a "DX" heat pump system which is based on the principle of providing optimal heat exchange in the heating mode through three parallel ground loops, two of which can be cut off from the system and evacuated of refrigerant in the cooling mode. The loops are designed in terms of volume so that the refrigerant charge is correct in the heating mode when split in three loops and also correct in the cooling mode when only one loop is used, but it contains the full system refrigerant charge. The loops are also provided with "TX" metering valves which can be individually operated to provide a staged cooling system.

The invention therefore provides, by one embodiment, a loop system for use in combination with a "DX" heat pump system for a staged cooling direct expansion geothermal heat pump, comprising a) from two to five earth loops, each such first, second and if desired, third, fourth and fifth earth loops including suction/hot gas line and a liquid line, each loop being adapted to be buried underground in heat exchange relationship with earth; b) a refrigerant vapor header connected to each of the suction/hot gas lines, such refrigerant vapor header being provided with first, second and third solenoid valves, each such valve being downstream of the connection of the respective suction/hot gas line to the refrigerant vapor header; c) a liquid line-header provided with a cooling "TX" valve; d) first, second and third connecting line means connecting the liquid line header to an associated one of the liquid lines of the three earth loops upstream of the cooling "TX" valve; e) first, second and third heating "DX" valves in an associated one of the first, second and third line means (d); and f) a solenoid valve in each of the second and third connecting line means, each such solenoid valve being interposed between the associated second and third heating "TX" valves and the liquid line header.

A two ton unit would have two loops, and a five ton unit would have five loops.

This invention also provides a staged cooling "DX" heat pump comprising:(a) from two to five earth loops, each such loop including a suction/hot gas line and a liquid line, each such loop line being adapted to be buried underground in heat exchange relationship with the earth; (b) a refrigerant vapor header provided with a first solenoid valve, a second solenoid valve and a third solenoid valve; (c) a liquid line header provided with a first electric solenoid valve; (d) a reversing valve having two inlets and two outlets; (e) a compressor having an inlet and an outlet, the outlet being connected to the hot gas inlet of the reversing valve; (f) an accumulator having an inlet and an outlet, the outlet being connected to the inlet of the compressor; (g) means for connecting the suction/hot gas line of the first loop to the refrigerant header downstream of the first solenoid valve; (h) means for connecting the suction/hot gas line of the second loop to the refrigerant vapor header downstream of the second solenoid valve; (i) means for connecting the suction/hot gas line of the third loop to the refrigerant vapor header downstream of the third solenoid valve; (j) first, second and third connecting lines for connecting the liquid line header to the associated first, second and third liquid lines of the associated first, second and third earth loops; (k) a first and a second and a third heating "TX" valve connected in an associated first, second and third connecting line and adapted to provide refrigerant metering in the heating mode, each such valve having one inlet and one outlet, an equalization port, and connected to a gas-filled controlling bulb; (1) first, second and third capillary line means for providing a capillary tube bypass between the inlet and the outlet of each of the first, second and third heating "TX" valves; (m) a fourth cooling "TX" valve connected in the liquid line header and adapted to provide refrigerant metering in the cooling mode, the cooling "TX" valve having one inlet and one outlet, an equalization port, and connected to a gas-filled controlling bulb; (n) a fourth capillary line means for providing a capillary tube by-pass around the cooling "TX" valve; (o) means for connecting the inlet of the first heating "TX" valve of the first earth loop to the liquid line header downstream of the cooling "TX" valve; (p) means for connecting the outlet of the first "TX" valve to the liquid line of the first earth loop; (q) means for connecting the first equalization tube of the first "TX" valve to a common suction line upstream of the accumulator; (r) means for placing the controlling bulb of the first heating "TX" valve in thermal contact with the suction/hot gas line of the first earth loop a short distance from the connection thereof to the refrigerant vapor header; (s) means for connecting the inlet port of the second heating "TX" valve to the outlet side of the fourth solenoid valve; (t) means for connecting the inlet side of the fourth solenoid valve to the common liquid line downstream of the fourth cooling "TX" valve; (u) means for connecting the output port of the second solenoid valve to the liquid line of the second earth loop; (v) means for connecting the equalization port of the second "TX" valve to the common suction line upstream of the accumulator; (w) means for connecting the inlet port of the third heating "TX" valve to the outlet side of the fifth solenoid valve; (x) means for connecting the inlet side of the fifth solenoid valve to the common liquid line downstream of the fourth cooling "TX" valve; (y) means for connecting the outlet port of the third heating "TX" valve to the liquid line of the third earth loop; (z) means for connecting the equalization port of the third heating "TX" valve to the common suction line upstream of the accumulator; (aa) means for placing the controlling bulb of the third heating "TX" valve into thermal contact with the suction line of the third earth loop a short distance from the connection thereof to the refrigerant vapor header; (bb) means for connecting the inlet port of the fourth cooling "TX" valve to a liquid line of a refrigerant/air coil heat exchanger; (cc) means for connecting the outlet port of the fourth cooling "TX" valve to the first liquid line header of the first heating "TX" valve and to the fourth and fifth solenoid valves; (dd) means for connecting the equalizer line of the fourth cooling "TX" valve to the common suction line upstream of the accumulator; (ee) means for placing the controller bulb of the fourth cooling "TX" valve into thermal contact with the refrigerant vapor line of the refrigerant/air heat exchanger coil a short distance from the outlet of the refrigerant/air heat exchanger coil; (ff) means for connecting a scavenging line to the main refrigerant vapor line upstream of the first solenoid valve and the second solenoid valve and for connecting the associated vapor lines of the first, second and third earth loops to the inlet of the third solenoid valve; (gg) means for connecting a line between the outlet of the third solenoid valve and the common suction line upstream of the accumulator; (hh) means for connecting the hot gas outlet of the reversing valve to the inlet of the refrigerant/air heat exchanger coil; (ii) means for connecting the common suction outlet of the reversing valve to the inlet of the accumulator; (jj) means for connecting the suction inlet of the reversing valve to the refrigerant vapor header downstream of all solenoid valves and individual earth loop vapor lines.

This invention also provides a method for operating such "DX" heat pump system in the heating mode. Such method comprises the steps of: (a) initially providing all the solenoid valves in their normally open state; (b) maintaining the fourth cooling "TX" fully open through connection of its equalizer tube to the common suction line upstream of the accumulator and through connection of its controlling bulb to the refrigerant vapor connection of the refrigerant/air heat exchanger coil which is hot in the heating mode; (c) allowing liquid refrigerant to flow into the liquid line header directly to the first heating "TX" and through the fourth and fifth solenoid valves to the second and third heating"TX" s respectively; (d) allowing the first, second and third heating "TX" s to meter liquid refrigerant down each of the first, second and third earth loops respectively, by virtue of a signal from the respective first, second and third controller bulbs; (e) allowing vaporized refrigerant to flow in each of the first, second and third suction lines to the refrigerant vapor header, through open the first and second solenoid valves as required, through the reversing valve and thence to the accumulator and to the compressor; (f) allowing compressed refrigerant gas to flow from the compressor through the reversing valve to the refrigerant/air heat exchanger coil; and (g) withdrawing liquid refrigerant from the refrigerant/air heat exchanger coil through a liquid outlet line towards the liquid line header.

This invention also provides a method for operating such "DX" heat pump system in the cooling mode. Such cooling mode includes three stages, embodying the following: (I) in a first stage, the steps of: (a) initial activation by an electric signal from a room thermostat that the "DX" heat pump has been placed in cooling mode; (b) closing the first, fourth and fifth solenoid valves; (c) opening the second and third solenoid; (d) closing the first refrigerant vapor header valve thereby allowing hot refrigerant vapor to enter only the first earth loop; (e) maintaining the first heating "TX" open by connection of its equalizer tube to the common suction line ahead of the accumulator and by connection of its controller bulb to the first vapor line of the first earth loop, the line being hot in the cooling mode; (f) passing hot compressed refrigerant from the outlet of the compressor outlet through the reversing valve and into the hot gas line which is downstream of the closed first solenoid valve; (g) allowing the heat pump to reject its heat to the ground at a pressure which is high enough to force liquid refrigerant through the liquid refrigerant line and through the first heating "TX" and on to the liquid line header which is connected to the inlet port of the fourth cooling "TX"; (h) closing the fourth and fifth liquid line solenoid valves, thereby preventing liquid refrigerant from entering the second and third earth loops which are downstream of the fourth and fifth solenoid valves; evaporating and scavenging residual liquid refrigerant from the liquid refrigerant lines which are downstream of the first solenoid valve in the refrigerant vapor header through first, second and third solenoid valves to the accumulator and then to the compressor; allowing the fourth cooling "TX" to meter the correct amount of liquid refrigerant into the refrigerant- /air heat exchanger coil by connection of the equalizer tube thereof to the common suction line ahead of the accumulator, and by connection of its controlling bulb thereof a short distance from the outlet of the refrigerant vapor outlet; and withdrawing warmed refrigerant gas from the refrigerant/air heat exchanger coil into the suction line and through the reversing valve into the accumulator and thence to the compressor suction inlet; (II) in a second stage, the steps of: (a) activating all solenoid valves and individual loop connections to the header by means of a first pressure sensing device on the refrigerant vapor header until pressure reaches a predefined point which is sufficient to override an electric signal sent by a room thermostat and thereby to operate a relay which activates the first, second and third loop solenoid valves; (b) opening the first, third and fourth solenoid valves and closing the second and fifth solenoid valves; (c) opening the first solenoid valve and closing the second solenoid valve to allow hot gas to flow to the first and second earth loops; (d) maintaining the first and second heating "TX"s open by connection of the equalizer tubes thereof to the common suction line upstream of the accumulator and by connection of the controller bulbs thereof to the first and second vapor lines which are hot in the cooling mode; (e) passing hot compressed refrigerant from the compressor through the reversing valve and through the refrigerant vapor header into the hot gas lines which are upstream of the closed second solenoid valve; (f) allowing the heat pump to reject its heat to the ground at a pressure which is high enough to force liquid refrigerant through the first and second liquid refrigerant lines through the first and second heating "TX"s and on the liquid line header connected to the inlet port of the fourth cooling "TX"; (g) closing the fifth liquid line solenoid valves, thereby preventing liquid refrigerant from entering the third loop which is downstream of the fifth solenoid valve 5; (h) evaporating and scavenging residual liquid refrigerant from the liquid refrigerant lines which are downstream of the second solenoid valve in the refrigerant vapor header, through the third solenoid valve to the accumulator and then to the compressor; (i) allowing the fourth cooling "TX" to meter the correct amount of liquid refrigerant into the refrigerant/air heat exchanger coil by virtue of the connection of the equalizer tube thereof to such common suction line upstream of the accumulator and by connection of the controlling bulb thereof a short distance from the refrigerant vapor outlet; (j) withdrawing warmed refrigerant gas from the refrigerant/air heat exchanger coil into the suction line and through the reversing valve into the accumulator and thence to the suction inlet of the compressor; and (III) in a third stage, the steps of: (a) activating all solenoid valves and individual loop connections to the header by a second pressure sensing device on the refrigerant vapor header, until the pressure reaches a predefined point which is sufficient to override an electric signal sent by a room thermostat and by the first pressure sensing device, and thereby to operate a relay which activates the loop solenoid valves; (b) allowing the first, second, fourth and fifth solenoid to be open while closing the third solenoid valve; opening the first and the second solenoid valves to allow hot gas to flow to the first, second and third earth loops; (c) maintaining the first, second and third heating "TX"s open by connection of the equalizer tubes thereof to the common suction line ahead of the accumulator and by connection of the controller bulbs thereof to the first, second and third vapor lines of the first, second and third earth loops, the lines being hot in the cooling mode; (d) passing hot compressed refrigerant from the outlet of the compressor through the reversing valve and through the refrigerant vapor header into the hot gas lines which are upstream of the closed solenoid valve; (e) allowing the heat pump to reject its heat to the ground at a pressure which is high enough to force liquid refrigerant through the first, second and third liquid refrigerant lines through the first, second and third heating "TX"s and through the open fourth and fifth solenoid valves and on to the liquid line header which is connected to the inlet port of the fourth cooling "TX"; (f) allowing the fourth cooling "TX" to meter the correct amount of liquid refrigerant into the refrigerant/air heat exchanger coil by connection of the equalizer tube thereof to the common suction line ahead of the accumulator and by connection of the controlling bulb thereof a short distance from the outlet of the refrigerant vapor; and (g) withdrawing warmed refrigerant gas from the refrigerant/air heat exchanger coil into the suction line and through the reversing valve into the accumulator and thence to the compressor suction inlet.

OTHER FEATURES OF THE INVENTION

By one feature of the loop system of this invention, the system includes (g) a scavenging line connected between the refrigerant vapor header and an accumulator.

By another feature of the loop system of this invention, the system includes (h) a compressor connected to the accumulator, the compressor being selectively connected to the liquid line header or to the refrigerant vapor header.

By yet another feature of the loop system of this invention, the system includes a reversing valve, actuatable to effect the selected connection of the compressor to the liquid line header to the refrigerant vapor header.

By still another feature of the loop system of this invention, the system includes an refrigerant/air heat exchanger coil interposed between the liquid line header and the refrigerant vapor header.

BRIEF DESCRIPTION OF THE DRAWINGS

In the accompanying drawings.

Figure 1:
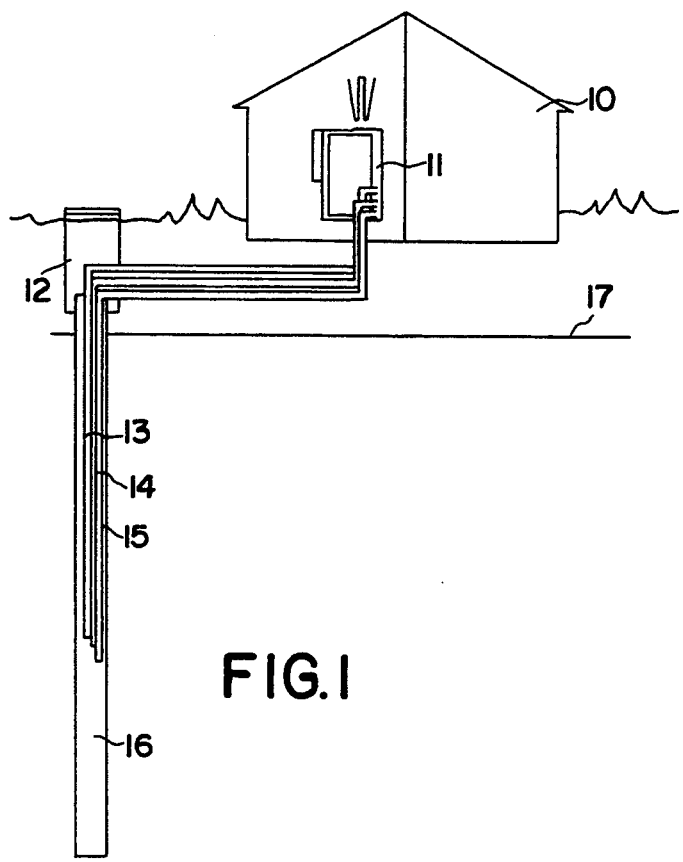
FIG. 1 is a schematic illustration of a vertical installation heat exchanger adaptable for the invention in the above-identified parent application Ser. No. 053,050 filed Apr. 23, 1993 for the present invention.

DESCRIPTION OF EMBODIMENTS OF THE INVENTION (i) Description of FIG. 1

As seen in FIG. 1, a house 10 to be heated and/or cooled includes a heat pump 11 and an access manhole cabinet 12. The system includes three earth loops 13, 14 and 15 disposed in a vertical borehole 16, well below the water table 17.

FIG. 1 shows a typical vertical 6" borehole with a 3 U-tube configuration. Liquid lines are $\frac{3}{8}$" OD. Suction/-hot gas lines are $\frac{5}{8}$" OD. Natural convection is obtained in the well by drilling to a depth of about 300 ft. and allowing the cold water to set up a thermocline during the winter months.

Figure 2:
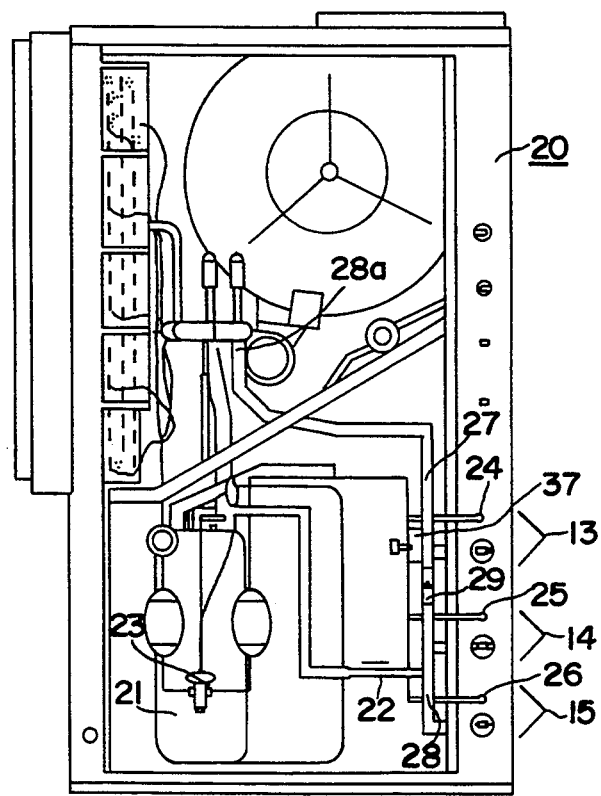
FIG. 2 is a schematic illustration of a cabinet component layout "DX"-to-air adaptable for the invention in the above-identified parent application Ser. No. 053,050 filed Apr. 23, 1993 for the present invention.

(ii) Description of FIG. 2

The cabinet seen in FIG. 2 includes a main cabinet 20 within which is mounted an accumulator 21 which supplies a source of the refrigerant a portion of which is received by way of scavenger line 22 to the inlet 23 of the accumulator 21. The refrigerant is supplied to lines 24, 25 and 26 leading to three earth loops 13, 14 and 15, respectively. The main return line 27 goes to the reversing valve suction inlet port 28a.

(iii.) Description of FIGS. 3 and 4

Figure 3:
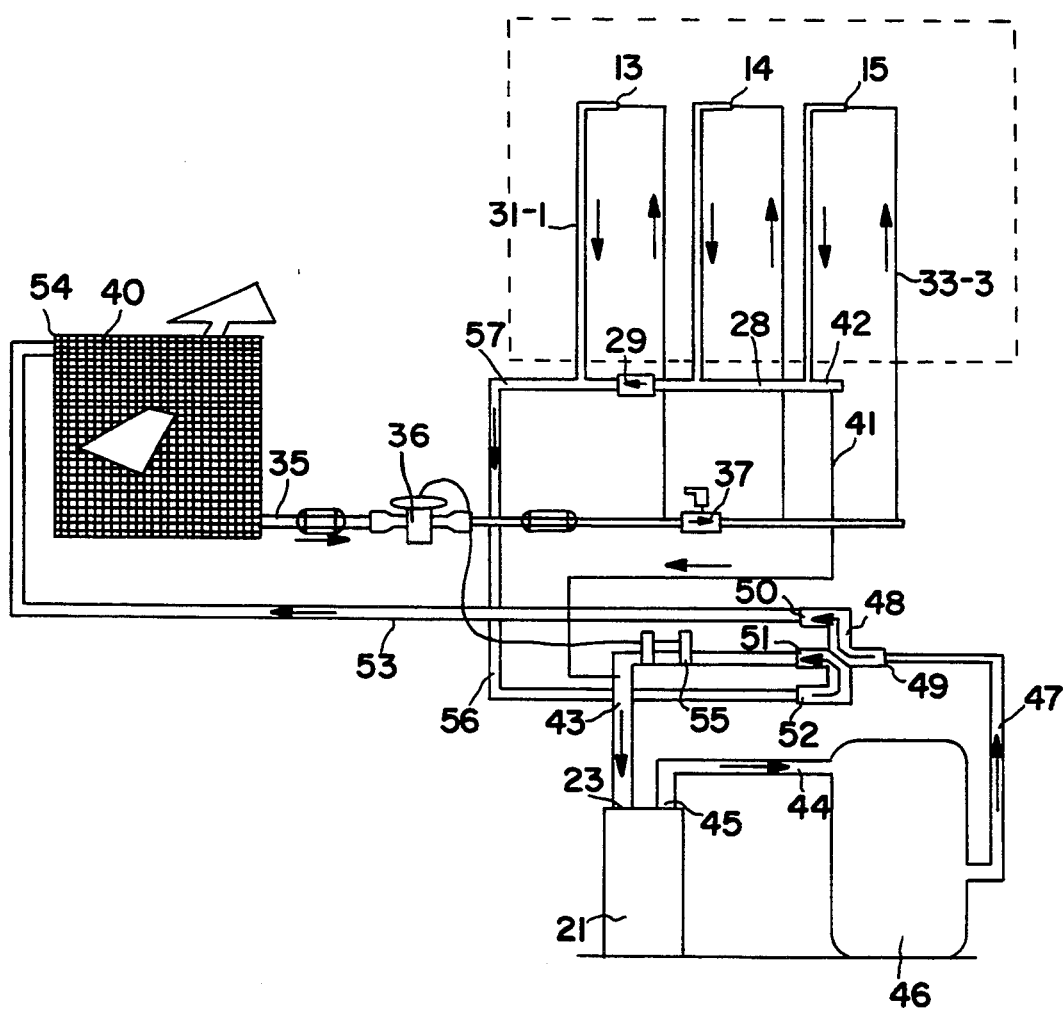
FIG. 3 is a schematic representation of one embodiment of a "DX" system of the invention in the above-identified parent application Ser. No. 08/053,050 filed Apr. 23, 1993 in the heating mode.
Figure 4:
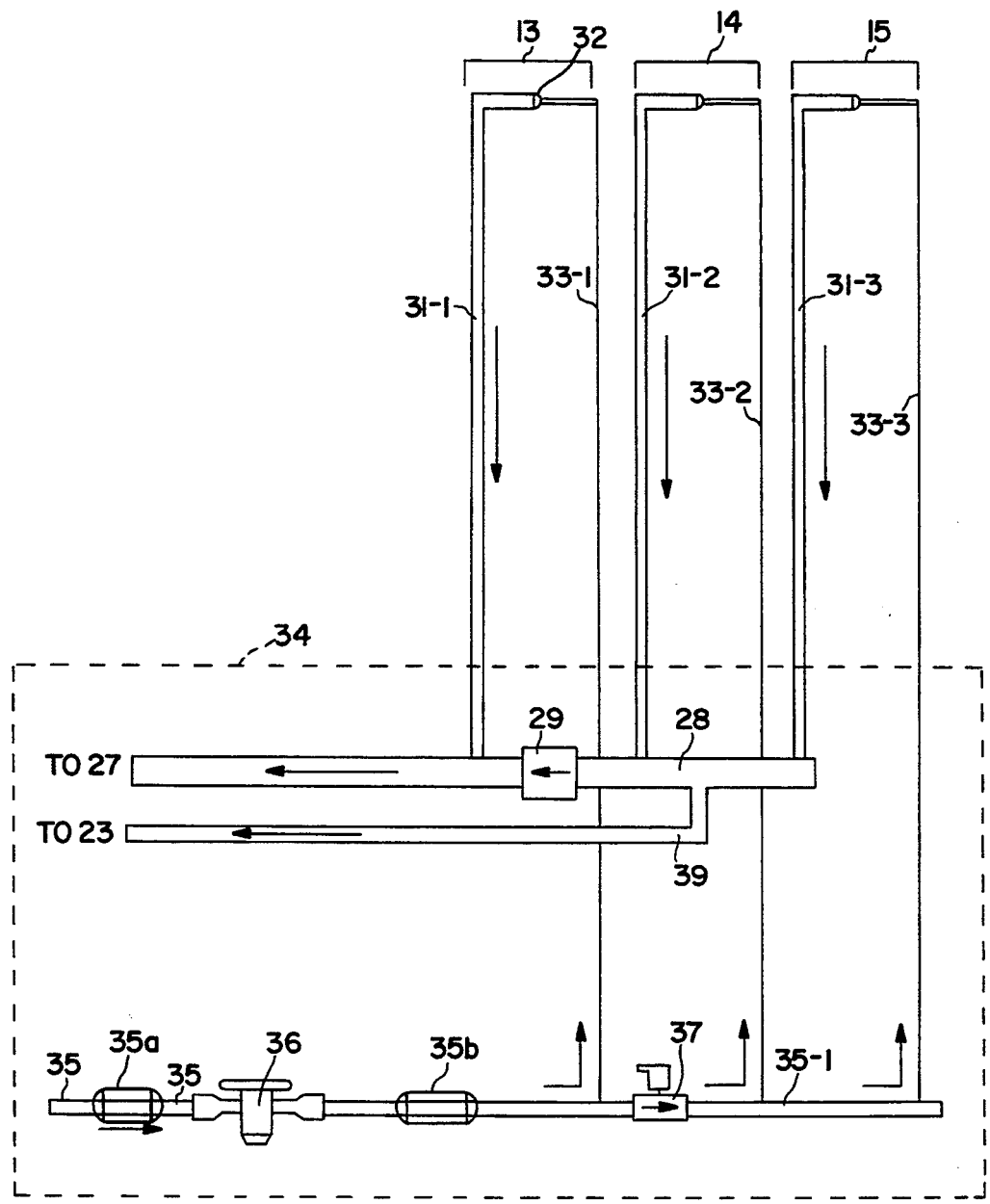
FIG. 4 is a schematic illustration of the "DX" system multiple loop configuration of FIG. 3, i.e., the invention in the above-identified parent application Ser. No. 053,050 filed Apr. 23, 1993 in the heating mode.

FIGS. 3 and 4 show one embodiment of the "DX" system of the invention provided in the above-identified patent application Ser. No. 08/053,050 filed Apr. 23, 1993, in its heating mode. In its physical construction, the "DX" system multi-loop configuration shown in FIG. 3 includes, as a core, the construction to be described hereinafter in FIG. 4. As seen in FIG. 3, the liquid line 35 is connected to and leads from an air condenser 40. An outflow line 41 is connected between the downstream end 42 of suction hot gas header 28 and the line 43 connected to the inlet 23 of the accumulator 21. The outlet line 45 of the accumulator 21 is connected to the inlet 44 of a compressor 46, where the outlet line 47 therefrom is connected to the inlet port 49 of a reversing valve 48. Reversing valve 48 has three outlet ports 50, 51 and 52. Port 50 is connected, by line 53 to the inlet 54 of the air condenser 40. Port 51 is connected to the inlet line 43 connected to accumulator 21. A temperature indicating bulb 55 is provided, bulb 55 controlling thermostatic expansion valve 36. Port 52 is connected, via line 56 to the downstream end 57 of refrigerant vapor header 28.

The core of the multi-loop system is shown in more detail in FIG. 4. It is noted that each of the three earth loops 13, 14 and 15 includes a suction gas line, i.e. 31-1, 31-2, 31-3 (respectively), which may be copper tubing of $\frac{5}{8}$" outside diameter connected by, e.g., a silver-soldered joint 32 to a respective downflow liquid refrigerant line, i.e. 33-1, 33-2, 33-3, which may be copper tubing of $\frac{3}{8}$" outside diameter. The underground piping 31-1, 31-2, 313 and 33-1, 33-2, 33-3 are each of sufficient length to provide for proper heat exchange with the earth for a given compressor size and earth conditions.

The broken line 34 represents the "DX" heat pump cabinet shown in FIG. 2. Within the "DX" heat pump cabinet is the refrigerant vapor header 28 (which leads to the main line 27 leading to the suction inlet port 28a of the reversing valve in the heating mode. Each of the suction gas lines 31-1, 31-2, 31-3 is connected thereto. It is noted that refrigerant vapor header 28 is fitted with a check valve 29. It is also to be observed that refrigerant vapor lines 31-2 and 31-3 are connected to suction header 28 upstream of check valve 29 and that suction gas line 33-1 is connected to refrigerant vapor header 28 downstream of check valve 29. The purpose of this configuration will be explained hereinafter. A scavenger line 39 leads from refrigerant vapor header 28 upstream of check valve 29 to the inlet 23 of the accumulator 21.

A main liquid refrigerant line 35 leads, via a first reversible filter drier 35a, a thermostatic expansion valve 36, a second reversible filter drier 35b, and an electric solenoid valve 37 to liquid refrigerant header 35-1 and to the liquid refrigerant lines 33-1, 33-2 and 33-3 of loops 13, 14 and 15. It is also to be observed that liquid refrigerant lines 33-2 and 33-3 are connected to liquid refrigerant header 35-1 downstream of electric solenoid valve 37, and that liquid refrigerant line 33-1 is connected to liquid refrigerant header 35-1 upstream of electric solenoid valve 35. The purpose of this configuration will be explained hereinafter in the description of the operation of the system.

Figure 5:
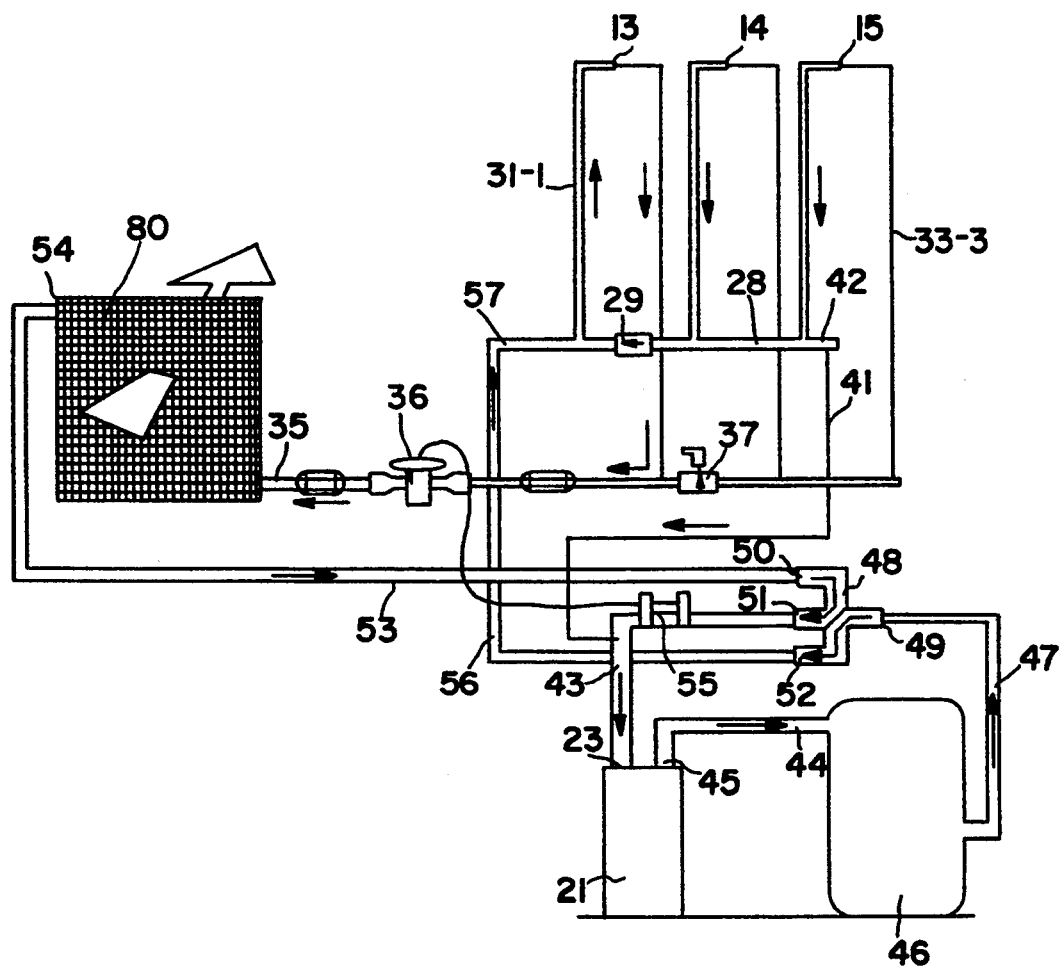
FIG. 5 is a schematic representation of one embodiment of a "DX" system of the invention in the above-identified parent application Ser. No. 08/053,050 filed Apr. 23, 1993 in the cooling mode.
Figure 6:
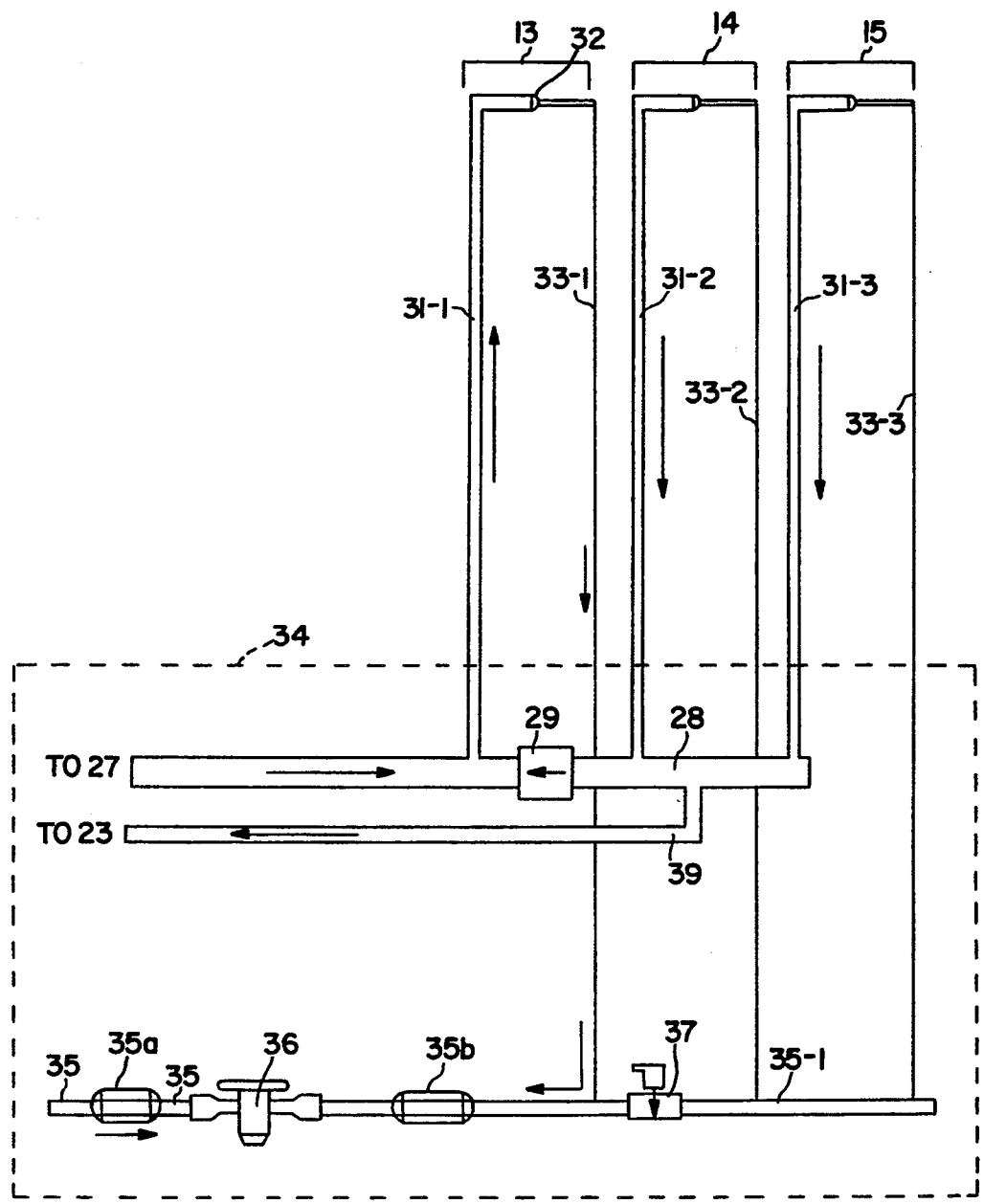
FIG. 6 is a schematic illustration of the "DX" system multiple loop configuration of FIG. 5, i.e., the invention in the above-identified parent application Ser. No. 08/053,050 filed Apr. 23, 1993 in the cooling mode.

(iv) Description of FIGS. 5 and 6

FIGS. 5 and 6 show the embodiment of the "DX" system of the invention provided in the above-identified patent application Ser. No. 08/053,050 filed Apr. 23, 1993, shown in FIGS. 3 and 4 in the cooling mode.

As seen in FIG. 5, in its physical construction, the "DX" system multi-loop configuration includes, as a core, the construction previously described for FIG. 4. However, in its cooling mode, it is seen that the liquid line 35 is connected to and leads from an air evaporator 40. An outflow line 41 is connected between the upstream end 42 of refrigerant vapor header 28 and the line 43 connected to the inlet 23 of the accumulator 21. The outlet line 45 of the accumulator 21 is connected to the inlet 44 of a compressor 46, where the outlet line 47 therefrom is connected to the inlet port 49 of a reversing valve 48. Reversing valve 48 has three outlet ports 50, 51 and 52. Port 50 is connected, by line 53 from the inlet 54 of the air condenser 80. Port 51 is connected to the inlet line 43 connected to accumulator 21. A temperature indicating bulb 55 is provided, bulb 55 controlling thermostatic expansion valve 36. Port 52 is connected, via line 56 to the downstream end 57 of refrigerant vapor header 28. The purpose of this configuration will be explained hereinafter in the description of the operation of the system.

Figure 7:
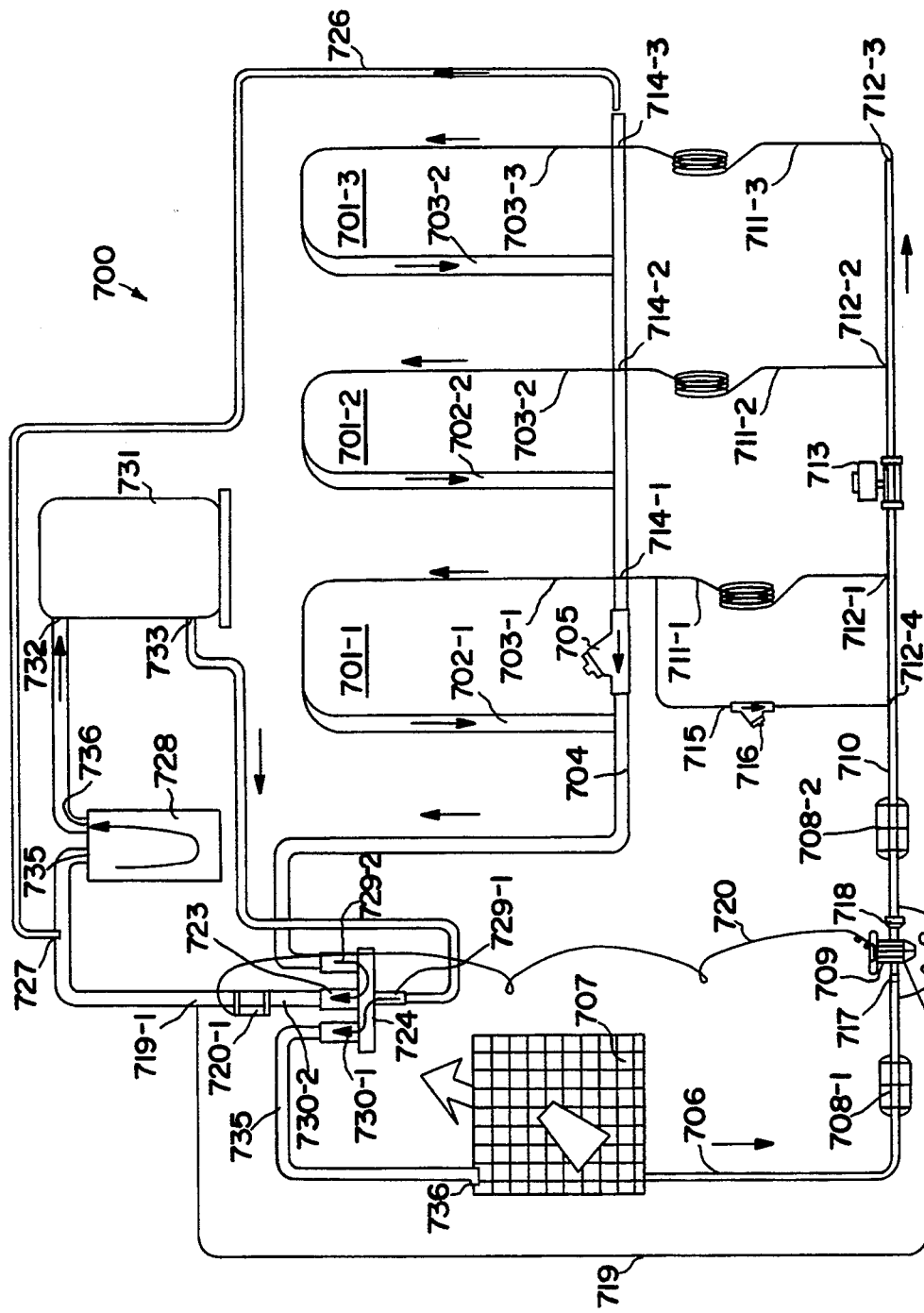
FIG. 7 is a schematic representation of another embodiment of the invention in the above-identified parent application Ser. No. 08/053,050 filed Apr. 23, 1993, i.e., a capillary-balanced feed, in the heating mode.
Figure 8:
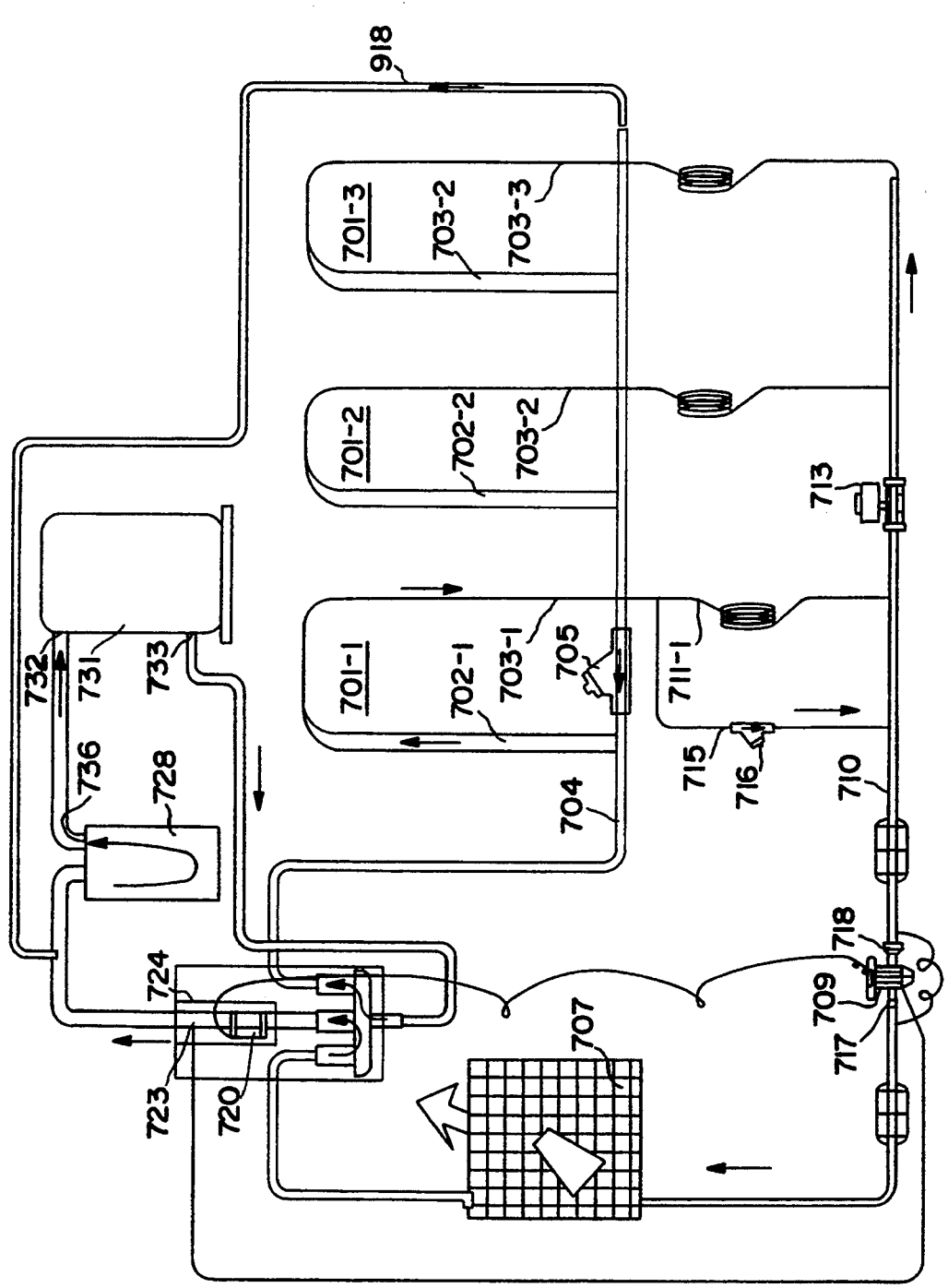
FIG. 8 is a schematic representation of another embodiment of the invention in the above-identified parent application Ser. No. 08/053,050 filed Apr. 23, 1993, i.e., a capillary-balanced feed, in the cooling mode.

(v) Description of FIGS. 7 and 8

FIGS. 7 and 8 show another embodiment of the invention provided in the above-identified patent application Ser. No. 08/053,050 filed Apr. 23, 1993, namely a capillary-balanced feed system, FIG. 7 showing the configurations in the heating mode, and FIG. 8 showing the configurations in the cooling mode.

As seen in FIGS. 7 and 8, the system 700 includes three earth loops. A first loop 701-1 includes a dual purpose refrigerant vapor line 702-1 and a liquid line 703-1. The second loop 701-2 and third loop 701-3 are operationally idle during the cooling mode. These loops include a suction line 702-2,703-2 respectively, and a liquid line 703-2, 703-3 respectively. Each loop 701-1, 701-2 and 701-3 is adapted to be buried underground in heat exchange relationship with the earth. A refrigerant vapor header 704 is provided with a check valve 705.

The refrigerant vapor line 702-1 of the first loop 701-1 is connected to the refrigerant header 704 downstream of the check valve 705. The suction lines 702-2,703-2 of each of the other two loops 701-2,701-3 respectively, are connected to the refrigerant vapor header 704 upstream of the check valve 705. A liquid line 706 leads from an air condenser 707 through a first reversible filter-drier 708-1, a thermostatic expansion ("TX") valve 709 and a second reversible filter-drier 708-2 to a liquid line header 710.

A first capillary tube 711-1 has inlet connected to liquid line header 710 at 712-1 upstream of a normally open electric solenoid valve 713. The outlet of first capillary tube 711-1 is connected to the liquid line 703-1 of first loop 701-1 at 714-1. A second capillary tube 711-2 has its inlet connected to liquid line header 710 downstream of valve 713 at 712-2 and has its outlet connected to liquid line 703-2 of second loop 701-2 at 714-2. A third capillary tube 711-3 has its inlet connected to liquid line header 710 downstream of both inlet 712-2 and valve 713 712-3 and has its outlet connected to liquid line 703-3 of third loop 701-3 at 714-3. A bypass line 715 has its outlet 712-4 at the liquid line header 710 and has its inlet connected to first capillary tube 711-1 to connect to liquid line 703-1. Bypass line 715 is also provided with a check valve 716. Thus, the three capillary tubes 711-1,711-2,711-3, are installed as restriction devices to provide balanced refrigerant metering in the heating mode.

The thermostatic expansion ("TX") valve 709 is connected to act as the primary refrigerant metering device. Valve 709 has one inlet 717, one outlet 718, one equalizer tube 719 leading to an equalization port 719-1 and one gas-filled line 720 leading to a gas-filled controlling bulb 720-1. A capillary tube bypass 721 is installed to bypass the inlet 717 and the outlet 718 of the thermostatic expansion valve 709. By its connection to equalization port 719-1, the equalizer tube 719 of the thermostatic expansion valve 709 is connected to the common suction outlet 723 of the reversing valve 724. The controlling bulb or sensing bulb of the thermostatic expansion valve 709, is placed in thermal contact with the common suction outlet 723 of the reversing valve 724. A scavenging line 726 is connected between the refrigerant vapor header 704 upstream of the check valve 705 and the inlet 735a of an accumulator 728. The reversing valve 724, has two inlets 729-1, 729-2 and two outlets 730-1,730-2. A compressor 731 having a suction inlet 732 and a discharge outlet 733 is provided, the discharge outlet 733 being connected by line 733a to the refrigerant vapor inlet 729-1 of the reversing valve 724.

The accumulator 728 has an inlet 735a and an outlet 736, the outlet 736 being connected to the inlet 732 of the compressor 731. The refrigerant vapor outlet 730-1 of the reversing valve 724 is connected by a refrigerant vapor line 735 to the inlet 736 of the air condenser 707.

The common suction outlet 723 of the reversing valve 724 is connected to the inlet 735a of the accumulator 728, and the suction inlet 729-2 of the reversing valve 724 is connected to the refrigerant vapor header 704 downstream of the check valve 705.

Figure 9:
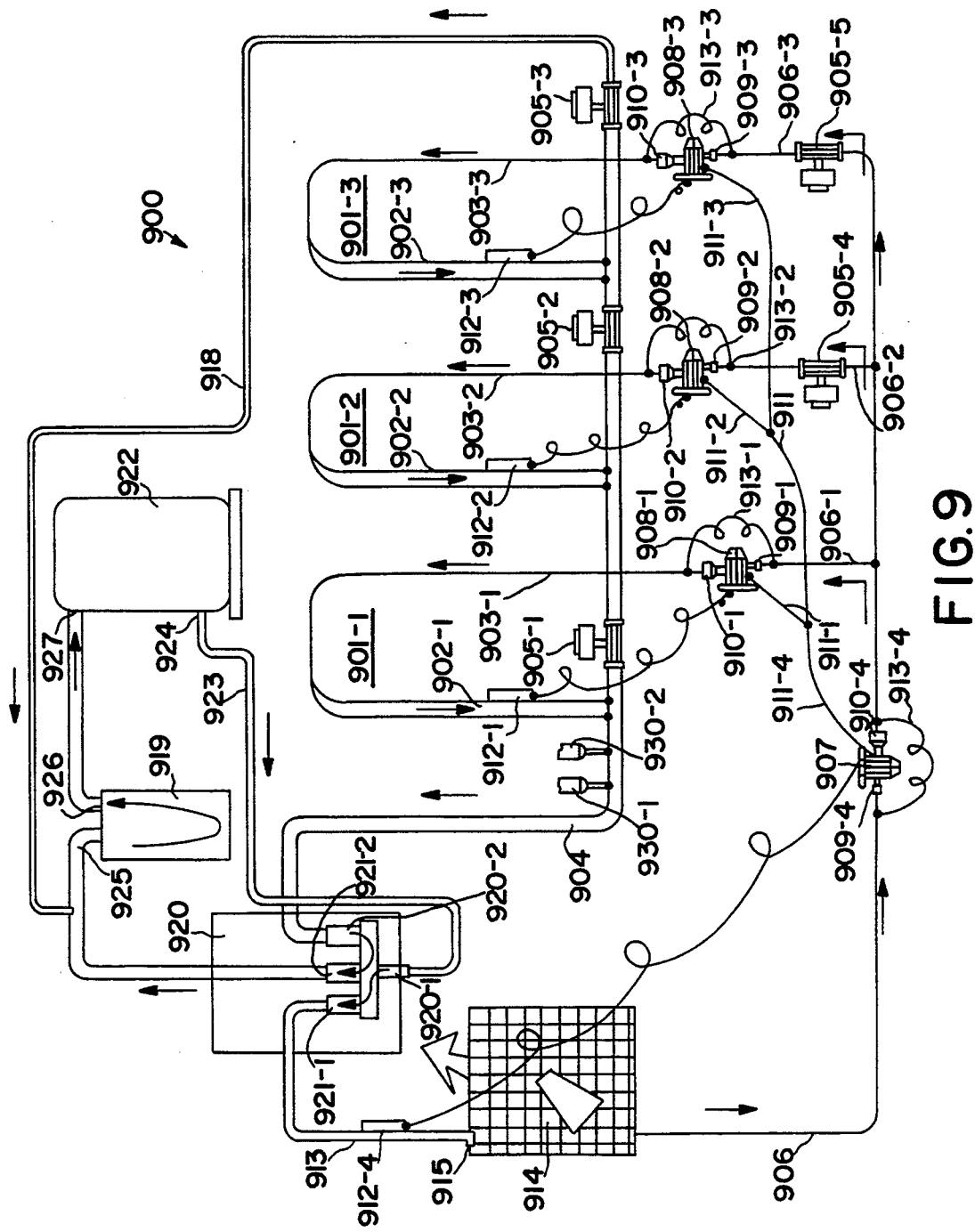
FIG. 9 is a schematic representation of one embodiment of the present invention, i.e., using individual "TX" valve metering for staged cooling, in the heating mode.
Figure 10:
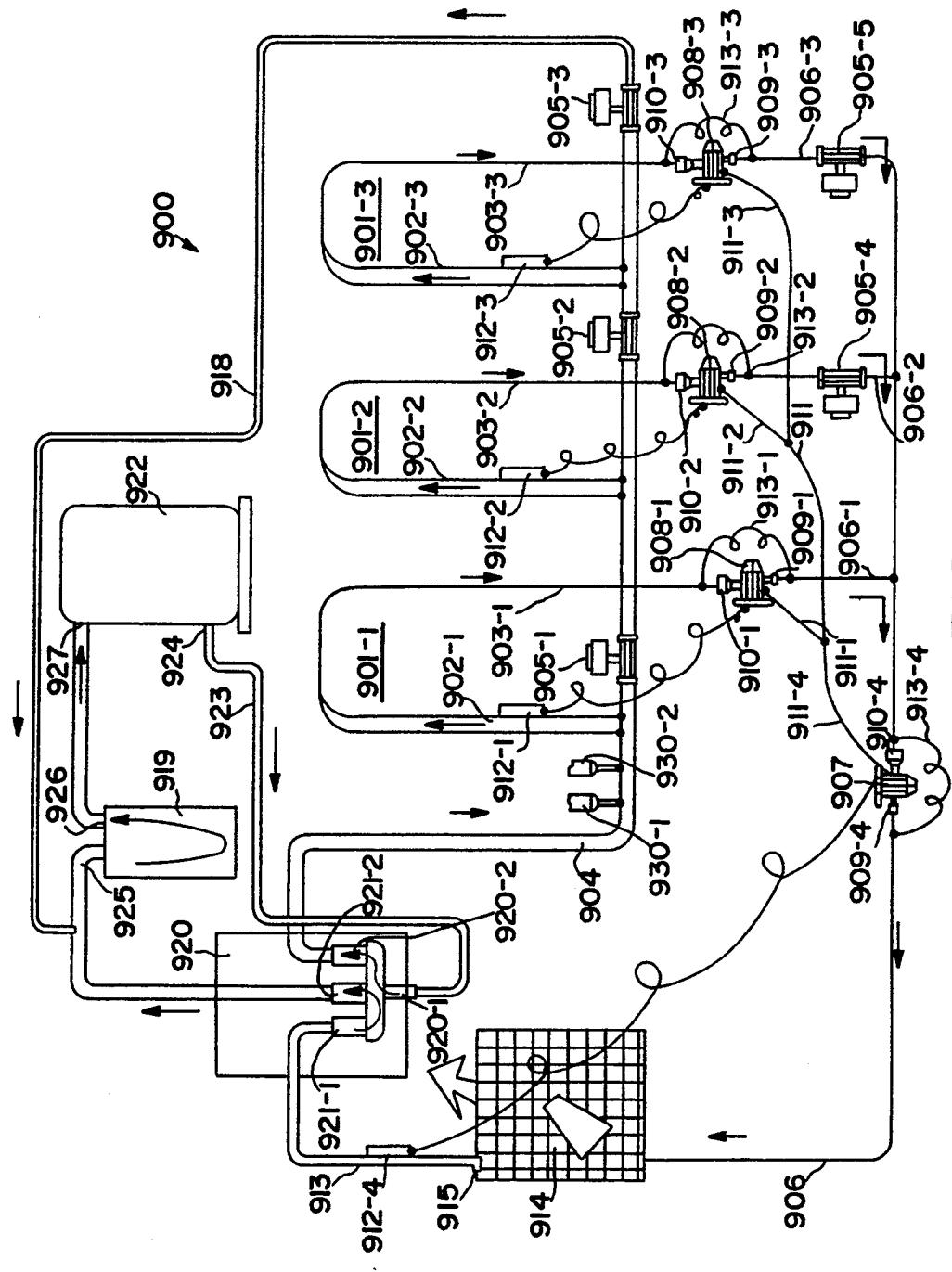
FIG. 10 is a schematic representation of the embodiment of the present invention shown in FIG. 9, i.e., using individual "TX" valve metering for staged cooling, in the cooling mode.

(vi) Description of FIGS. 9 and 10

FIGS. 9 and 10 show a preferred embodiment of the present invention, namely using individual "TX" valve metering for staged cooling, FIG. 9 being the configuration for the heating mode and FIG. 10 being the configuration for the cooling mode.

As seen in FIGS. 9 and 10, the system 900 includes three earth loops, namely a first loop 901-1 including a refrigerant vapor suction/hot gas line 902-1 and a liquid line 903-1, and the second loop 901-2 and the third loop 901-3, each such loop including a suction/hot gas line 902-2, 902-3 and a liquid line 903-2, 903-3 respectively. Each loop 901-1, 901-2, 901-3 is adapted to be buried underground in heat exchange relationship with the earth. A refrigerant vapor header 904 is provided with a first pressure sensing device 930-1 and with a second pressure sensing device 930-2. In addition, the refrigerant header 904 is provided with three solenoid valves 905-1, 905-2, 905-3. The refrigerant vapor line 902-1 of the first loop 901-1 is connected to the refrigerant vapor header 904 upstream of the first solenoid valve 905-1. The refrigerant vapor line 902-2 of the second loop 901-2 is connected to the refrigerant vapor header 904 upstream of the second solenoid valve 905-2, and similarly, the refrigerant vapor line 902-3 of the third loop 901-3 is connected to the refrigerant vapor header 904 upstream of the third solenoid valve 905-3. The liquid line header 906 is provided with a cooling thermostatic expansion valve ("TX" valve) 907. Cooling "TX" valve 907 has one inlet 909-4 and one outlet 910-4, an equalizer line 911-4 leading from an equalizer port, and a connection to a gas-filled controlling bulb 912-4. A capillary tube bypass 913-4 is installed between the inlet 909-4 and the outlet 910-4 of the cooling "TX" valve 907. Three heating "TX" valves, namely, 908-1, 908-2, 908-3 are installed in liquid lines 906-1, 906-2, 906-3, respectively, and provide refrigerant metering in the heating mode, each "TX" valve 908-1, 9082, 908-3 having one inlet 909-1, 909-2, 909-3, respectively, and one outlet 910-1, 910-2, 910-3, respectively, a heating equalizer line 911-1,911-2,911-3, respectively, leading to a respective equalizer port, and a connection to a gas-filled controlling bulb 912-1, 912-2,912-3, respectively. A capillary tube bypass 913-1, 913-2, 913-3 in lines 906-1, 906-2, 906-3, respectively, bypasses the inlet 909-1, 909-2, 909-3, respectively, and the outlet 910-1, 910-2, 910-3, respectively, of each of the heating "TX" valves 908-1,908-2,908-3, respectively. The inlet 909-1 of the first heating "TX" valve 908-1 is connected by liquid line 906-1 to the liquid line header 906 downstream of the cooling "TX" valve 907. The outlet 910-1 of that "TX" valve 908-1 is connected to the liquid line 903-1 of the first earth loop 901-1. The equalizer line 911-1 from its associated equalization port of that "TX" valve 908-1 is connected to the equalization port of cooling "TX" valve 907 via line 911-4. The controlling bulb 912-1 connected to that "TX" valve 908-1 is placed in thermal contact with the refrigerant vapor line 902-1 of the first loop 901-1 a short distance from its connection to refrigerant vapor header 904.

Similarly, the inlet 909-2 of the second heating "TX" valve 908-2 is connected by liquid line 906-2 to the liquid line header 906 downstream of the cooling "TX"

valve 907. The outlet 910-2 of that "TX" valve 908-2 is connected to the liquid line 903-2 of the second earth loop 901-2. The equalizer line 911-2 from its associated equalization port of that "TX" valve 908-2 is connected to the equalization port of cooling "TX" valve 907 via line 911 and line 911-1. The controlling bulb 912-2 connected to that "TX" valve 908-2 is placed in thermal contact with the refrigerant vapor line 902-2 of the second loop 901-2 a short distance from its connection to refrigerant vapor header 904.

Also, similarly, the inlet 909-3 of the third heating "TX" valve 908-3 is connected by liquid line 906-3 to the liquid line header 906 downstream of the cooling "TX" valve 907. The outlet 910-3 of that "TX" valve 908-3 is connected to the liquid line 903-3 of the third earth loop 901-3. The equalizer line 911-3 from its associated equalization port of that "TX" valve 908-3 is connected to the equalization port of cooling "TX" valve 907 via line 911 and 911-1. The controlling bulb 912-3 connected to that "TX" valve 908-3 is placed in thermal contact with the refrigerant vapor line 902-3 of the third loop 901-3 a short distance from its connection to refrigerant vapor header 904.

Line 906-2 leading from liquid line 906 to the liquid line 903-2 of the second loop 901-2 is fitted with a fourth solenoid valve 905-4, and similarly, line 906-3 leading from liquid line 906 to the liquid line 903-3 of the third loop 901-3 is fitted with a fifth solenoid valve 905-5.

As seen in FIGS. 9 and 10, and as previously described, cooling "TX" valve 907 provides refrigerant metering in the cooling mode (shown explicitly in FIG. 10). As previously described, cooling "TX" valve 907 has one inlet 909-4 and one outlet 910-4, a cooling equalizer line 911-4 leading to a cooling equalization port and a connected to a gas-filled controlling bulb 912-4. All equalizer lines 911-1, 911-2, 911-3, 911-4 are interconnected by means of equalizer line 911. The controller bulb 912-4 connected to the cooling "TX" valve 907 is placed in thermal contact with the refrigerant vapor line 913 of the refrigerant/air heat exchanger coil 914 a short distance from the outlet 915 of the refrigerant/air heat exchanger coil 914.

A scavenging line 918 is connected between the refrigerant vapor header 904 downstream of the third solenoid valve 905-3 and an accumulator 919. A compressor 922 in the system has a suction inlet 927 and a discharge outlet 924. A reversing valve 920 is connected between outlet line 923 of compressor 922 and inlet line 925 of accumulator 919, reversing valve 920 having two inlets 920-1, 920-2 and two outlets 921-1, 921-2. The discharge outlet 924 to line 923 is connected to the hot gas inlet 920-1 of the reversing valve 920. The accumulator 919 in the system has an inlet 926a and an outlet 926. The outlet 926 is connected to the suction inlet 927 of the compressor 922. The hot gas outlet 921-1 of the reversing valve 920 is connected to the inlet 915 of the air coil 914 by line 913. The common suction outlet 921-2 of the reversing valve 920 is connected to the inlet 926a of the accumulator 919. The suction inlet 920-2 of the reversing valve 920 is connected to the refrigerant vapor header 904 downstream of the first solenoid valve 905-1.

(vii) Operation of the System of FIGS. 3 and 4 in the Heating Mode

In the operation of the system of a first embodiment of the invention provided in the above-identified patent application Ser. No. 08/053,050 filed Apr. 23, 1993, in the heating mode shown in FIGS. 3 and 4, it is seen that there are three (3) circuits, i.e., three earth loops 13, 14 and 15, operational as an evaporator in the heating mode. During typical operation, each earth loop 13, 14 and 15 would be approximately 25% full of liquid refrigerant. The conventional $\frac{3}{8}$" OD copper tubing used in the exchanger provides sufficient velocity to entrain the oil, whether the earth loops 13, 14 and 15 are installed vertically or horizontally. As shown in FIG. 4, the solenoid valve 37 is open and allows liquid refrigerant to be metered down all three liquid lines 33-1, 33-2, and 33-3 where it is vaporized by the warm earth and returns via the three suction lines 31-1, 31-2 and 31-3 and to suction header 28. Check valve 29 is sited after (i.e. upstream) of loop 13 and before (i.e. downstream) of loops 14 and 15 in the main refrigerant vapor header 28. This configuration allows warmed gas from all three lines, 31-1, 31-2, 31-3, to proceed to the accumulator 21 and thence to the compressor 46. Line 41 is a conventional $\frac{1}{4}$" OD copper line which serves no useful purpose in the heating mode as described herein but is absolutely imperative to the system in the cooling mode. Line 41 must be placed upstream of the check valve 28 as shown so that it will be able to evacuate loops 14 and 15 in the cooling mode. The placement of solenoid valve 37 and check valve 28 are technically important so that loop 13 can be separated from loops 14 and 15 during the cooling mode.

(viii) Operation of the System of FIGS. 5 and 6 in the Cooling Mode

The operation of the system of a first embodiment of the invention provided in the above-identified patent application Ser. No. 08/053,050 filed Apr. 23, 1993, in the cooling mode as shown in FIG. 5, is such that, during the cooling mode, solenoid valve 37 is closed, preventing liquid refrigerant from entering loops 14 and 15. Check valve 28 insures that hot refrigerant gas enters only the cooling loop 13. Line 41 begins to scavenge any refrigerant in loops 14 and 15 since they are open to the suction side of the compressor 46. The extra refrigerant is quickly pumped to loop 13 which is the only active cooling loop. The extra refrigerant from loops 14 and 15 fills the single condenser loop 13 to such a level as will allow the heat pump to reject its heat to the ground at a head pressure high enough to force the liquid refrigerant back to the single $\frac{3}{8}$" O.D. liquid line 33-1 to the expansion valve 36, into the air evaporator 80 and exiting via outlet line 54 back to the accumulator 21 via the reversing valve 48, thus establishing continuity in the process.

(ix) Operation of The Second Embodiment of FIG. 7 in the Heating Mode

In the operation of a second embodiment in the heating mode, the liquid line solenoid valve 713 is opened. The bypass check valve 716 around capillary tube 711-1 is maintained closed by high pressure liquid. The "TX" valve 709 is allowed to meter liquid refrigerant to the liquid line header 710 controlled by a signal of the controller bulb 720-1. The capillary tubes 711-1, 711-2, 711-3 are allowed to restrict the flow slightly so that equal pressure is maintained on the inlet side 712-1, 712-2, 712-3 of each capillary tube 711-1, 711-2, 711-3. Liquid refrigerant is allowed to flow down the liquid lines 703-1, 703-2, 703-3. Vaporized refrigerant is allowed to flow upwardly in each of the suction lines 702-1, 702-2, 702-3 and the refrigerant vapor header 704 through the reversing valve 724 and thence to the accumulator 728 and to the compressor 731. Compressed refrigerant gas is then flowed from the compressor 731 through the reversing valve 724 to the air coil 707. Liquid refrigerant is then withdrawn from the air coil 707 through a liquid line 706 towards the "TX" valve 709 and liquid line header 710.

(x) Operation of The Second Embodiment of FIG. 8 in the Cooling Mode

In the operation of a second embodiment of the invention provided in the above-identified patent application Ser. No. 08/053,050 filed Apr. 23, 1993, in the cooling mode, the liquid line solenoid valve 713 is closed. The bypass check valve 716 around capillary tube 711-1 is maintained open by high pressure liquid. Residual liquid refrigerant is evaporated and scavenged from the idle suction lines 702-2, 702-3 by way of scavenger line 918 into the accumulator 728 and thence to the compressor. Compressed refrigerant is passed through the reversing valve 724 and into the hot gas line extension of the refrigerant vapor header 704 which is downstream of the check valve 705 on the refrigerant vapor header 704. The heat pump 11 is allowed to reject its heat to the ground at a pressure which is high enough to force liquid refrigerant up the liquid line 703-1. The liquid refrigerant is allowed to flow through the bypass line 715 and check valve and also through the parallel capillary tube 711-1 of ground loop 701-1 to inlet to the "TX" valve 709. The "TX" valve 709 meters liquid refrigerant to the air coil 707 as per the signal of the controller bulb 720. Warmed refrigerant gas is withdrawn from the air coil 707 into the suction line and through the reversing valve 724 and through the common suction outlet 723 into the accumulator 728 and thence to the suction inlet 732 of the compressor 731.

(xi) Operation of The Preferred Embodiment of the Invention of FIG. 9 in the Heating Mode The operation of the preferred embodiment of the present invention in the heating mode, using the present stage cooling mode technique is as follows: All solenoid valves 905-1, 905-2, 905-3, 905-4 and 905-5 are initially allowed to be in their normally open state. The cooling "TX" valve 907 is maintained fully open by indirect connection of its equalizer tube to the common suction line 925 upstream of the accumulator 919 and through connection of its controlling bulb 912-4 to the refrigerant vapor connection 913 of the refrigerant/air condenser 914 which is hot in the heating mode. Liquid refrigerant is allowed to flow into the liquid line header 906 directly to heating "TX" valve 907 and through solenoid valves 905-4 and 905-5 to heating "TX" valves 908-2 and 908-3, respectively. The heating "TX" valves 908-1, 908-2, 908-3 are allowed to meter liquid refrigerant down each of the three earth loops 901-1, 901-2, 901-3 by way of the signal of the respective controller bulbs 912-1, 912-2, 912-3. Vaporized refrigerant is allowed to flow downwardly in each of the suction lines 902-1, 902-2, 902-3 to the refrigerant vapor header 904, through open solenoid valves 905-1, 905-2, 905-3 as required, through the reversing valve 920 and thence to the accumulator 919 and to the compressor 922. Compressed refrigerant gas is allowed to flow from the compressor 922 through the reversing valve 920 to the refrigerant/air condenser coil 914. Finally, liquid refrigerant is withdrawn from the refrigerant/air condenser coil 914 through liquid line and liquid line header 906.

(xiii) Operation of The Preferred Embodiment of the Invention of FIG. 10 in the Cooling Mode The operation of the preferred embodiment of the present invention in the cooling mode using the present staged cooling mode technique is in three stages as follows:

In the first stage, initial activation is accomplished by an electric signal from the room thermostat which instructs the "DX" heat pump to be placed in cooling mode. Solenoid valves 905-1, 905-4, 905-5 are closed and solenoid valves 905-2, 905-3 are opened. Since solenoid valve 905-1 is closed, hot refrigerant vapor is allowed to enter only loop 901-1. Heating "TX" valve 908-1 is maintained open by indirect connection of its equalizer tube to the common suction line 925 ahead of the accumulator 919 and by connection of its controller bulb 912-1 to the vapor line 902-1 of loop 901-1 which is hot in the cooling mode. Hot compressed refrigerant is passed from the compressor outlet 924 through the reversing valve 920 and into the hot gas line 913 which is downstream of closed solenoid valve 905-1. The heat pump 900 is allowed to reject its heat to the ground at a pressure which is high enough to force liquid refrigerant through the liquid refrigerant line 906 and through heating "TX" valve 905-1 and via reversing valve 920 on to the liquid line header 913 connected to the inlet port 909-4 of the cooling "TX" valve 907. Liquid line solenoid valves 905-4, 905-5 are closed, thereby preventing liquid refrigerant from entering the two loops 902-2. 902-3 which are downstream of the solenoid valves 904-4, 905-5. Residual liquid refrigerant is evaporated and scavenged from the liquid refrigerant lines which are downstream of the refrigerant vapor header solenoid valve 905-1, through solenoid valves 905-2, 905-3 via scavenger line 918 to the accumulator 919 and then to the compressor 922. The cooling "TX" valve 907 is allowed to meter the correct amount of liquid refrigerant into the air evaporator 914 by indirect connection of its equalizer tube to the common suction line 925 ahead of the accumulator 919 and by connection of its controlling bulb 912-4 a short distance from the refrigerant vapor outlet 925. Finally, warmed refrigerant gas is withdrawn from the air evaporator 914 into the suction line 913 and through the reversing valve 920 into the accumulator 919 and thence to the compressor suction inlet 923.

In the second stage, all solenoid valves 905-1, 905-2, 905-3, 905-4, 905-5 and individual loop connections 901-1, 901-2, 901-3 to the header 904 are actuated by means of a first pressure sensing device 930-1 placed on the refrigerant vapor header 904 upstream of solenoid valve 905-1 until the pressure reaches a predefined point which is sufficient to override the electric signal sent by the room thermostat and thereby to operate a relay (not shown) which activates the loop solenoid valves 905-1, 905-2, 905-3. Solenoid valves 905-1, 905-3, 905-4 are opened and solenoid valves 903-2, 903-5 are closed. Solenoid valve 905-1 is then opened and solenoid valve 905-2 is then closed to allow hot gas to flow to loops 901-1, 901-2. Heating "TX" valves 908-1, 908-2 are maintained open by indirect connection of their equalizer tubes to the common suction line 925 upstream of the accumulator 919 and by connection of their controller bulbs 912-1, 912-2 to vapor lines 902-1, 902-2 of loops 901-1, 901-2, respectively, which are hot in this stage 2 cooling mode. Hot compressed refrigerant is passed from the compressor outlet 924 through the reversing valve 920 and refrigerant vapor header 904 into the hot gas lines 902-1, 902-2 which are upstream of closed solenoid valve 905-2. The heat pump 900 is allowed to reject its heat to the ground at a pressure which is high enough to force liquid refrigerant through the liquid refrigerant lines 903-1, 903-2 through heating "TX" valves 905-1, 905-2 and on the liquid line header 906 which is connected to the inlet port 910-4 of the cooling "TX" valve 907. Liquid line solenoid valve 905-5 is closed, thereby preventing liquid refrigerant from entering loop 901-3 which is downstream of the solenoid valve 905-5. Residual liquid refrigerant is evaporated and scavenged from the liquid refrigerant lines which are downstream of the refrigerant vapor header solenoid valve 905-2, through solenoid valve 905-3 via scavenger line 918 to the accumulator 919 and then to the compressor 922. The cooling "TX" valve 907 is allowed to meter the correct amount of liquid refrigerant into the air evaporator 914 by virtue of the indirect connection of its equalizer tube to the common suction line 925 which is upstream of the accumulator 919 and by connection of its controlling bulb 912-4 a short distance from the refrigerant vapor outlet 915. Finally, warmed refrigerant gas is withdrawn from the air evaporator into the suction line and through the reversing valve into the accumulator and thence to the compressor suction inlet.

In the third stage, all solenoid valves 905-1. 905-2, 905-3, 905-4, 905-5 and individual loop connections 901-1, 901-2, 901-3 to the header 904 are actuated by a second pressure sensing device 730-2 placed on the refrigerant vapor header 913 upstream thereof, until the pressure reaches a predefined point sufficient to override the electric signal sent by the room thermostat and the first pressure sensing device 930-1 and thereby to operate a relay (not shown) which activates the loop solenoid valves by allowing solenoid valves 905-1, 905-2, 905-4, 905-5 to be open while closing solenoid valve 905-3. Solenoids valves 905-1, 905-2 are then opened to allow hot gas to flow to loops 901-1, 901-2, 901-3. Heating "TX" valves 905-1, 905-2, 905-3 are maintained open by indirect connection of their equalizer tubes to the common suction line 925 ahead of the accumulator 919 and by connection of their controller bulbs to the vapor lines 902-1, 902-2, 902-3 of loops 901-1, 901-2, 901-3 which are hot in the stage 3 cooling mode. Hot compressed refrigerant is then passed from the compressor outlet 925 through the reversing valve 920 and refrigerant vapor header 904 into the hot gas lines which are upstream of closed solenoid valve 905-3. The heat pump 900 is allowed to reject its heat to the ground at a pressure which is high enough to force liquid refrigerant through the liquid refrigerant lines 903-1, 903-2 and 903-3. Through heating "TX" valves 908-1, 908-2, 908-3 and through open solenoids valves 905-4, 905-5 and on to the liquid line header 906 which is connected to the inlet port 910-4 of the cooling "TX" valve 907. The cooling "TX" valve 907 is allowed to meter the correct amount of liquid refrigerant into the air evaporator 914 by indirect connection of its equalizer tube to the common suction line 925 ahead of the accumulator 919 and by connection of its controlling bulb 912-4 a short distance from the refrigerant vapor outlet 915. Finally, warmed refrigerant gas is withdrawn from the air evaporator 914 into the suction line 913 and through the reversing valve 920 into the accumulator 919 and thence to the compressor suction inlet 923.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A loop system for use in combination with a "DX" heat pump system comprising:
    a) three loops, each of said first loop, said second loop and said third loop including a suction/hot gas line and a liquid line, each said loop being adapted to be buried underground in heat exchange relationship with earth;
    b) a refrigerant vapor header connected to each of said suction/hot gas lines, and said refrigerant vapor header being provided with first, second and third solenoid valves, each said valve being downstream of the connection of the respective suction/hot gas line to said refrigerant vapor header;
    c) a liquid line header provided with a cooling thermostatic expansion valve;
    d) first, second and third connecting line means connecting said liquid line header to an associated one of said liquid lines of said three loops upstream of said cooling thermostatic expansion valve;
    e) first, second and third heating direct expansion valves in an associated one of said first, second and third line means (d); and
    f) a solenoid valve in each of said second and third connecting line means, each said solenoid valve being interposed between an associated second and third connection line means between an associated second and third heating thermostatic expansion valve an said liquid line header.

2. The loop system of claim 1 including (g) a scavenging line connected between said refrigerant vapor header and an accumulator.

3. The loop system of claim 2 including: (h) a compressor connected to said accumulator, said compressor being selectively connected to said liquid line header or to said refrigerant vapor header.

4. The loop system of claim 3 including (i) reversing valve, actuatable to effect said selected connection of said compressor to said liquid line header to said refrigerant vapor header.

5. The loop system of claim 4 including an air/refrigerant heat exchanger coil interposed between said liquid line header and said refrigerant vapor header.

6. A staged cooling, direct expansion heat pump comprising:
    (a) three earth loops, each said loop including, a suction/hot gas line and a liquid line, each said loop line being adapted to be buried underground in a heat exchange relationship with the earth;
    (b) a refrigerant vapor header provided with a first, a second and a third solenoid valve, means for connecting said suction/hot gas line of said first loop to the refrigerant header downstream of said first solenoid valve;
    (c) means for connecting said suction/hot gas line of said second loop to said refrigerant vapor header downstream of said second solenoid valve;
    (d) means for connecting said suction/hot gas line of said third loop to said refrigerant vapor header downstream of said third solenoid valve;
    (e) a liquid line header provided with a first and a second electric solenoid valve;

(f) a first and a second and a third heating thermostatic expansion valve adapted to provide refrigerant metering in the heating mode, each said valve having one inlet, and one outlet, an equalization port, and a gas-filled controlling bulb;

(g) a fourth cooling thermostatic expansion valve adapted to provide refrigerant metering in the cooling mode, said cooling thermostatic expansion valve having one inlet, one outlet, an equalization port, and a gas-filled controlling bulb;

(h) capillary line means for providing a capillary tube by-pass around said cooling thermostatic expansion valve;

(i) capillary line means for providing a capillary tube bypass between the inlet and the outlet of each of the first, second and third heating thermostatic expansion valves;

(j) means for connecting the inlet of said first heating thermostatic expansion valve of said first earth loop to said liquid line header downstream of said cooling thermostatic expansion valve;

(k) means for connecting the outlet of said first thermostatic expansion valve to said liquid line of said first earth loop;

(l) means for connecting said first equalization tube of said first thermostatic expansion valve to a common suction line upstream of an accumulator;

(m) means for placing the first controlling bulb of said first thermostatic expansion valve in thermal contact with said suction/hot gas line of said first earth loop 1 a short distance from the connection thereof to said refrigerant vapor header;

(n) means for connecting said inlet port of said second heating thermostatic expansion valve to said outlet side of the fourth said solenoid valve;

(o) means for connect&rig said inlet side of said fourth solenoid valve to said common liquid line downstream of said fourth cooling thermostatic expansion valve;

(p) means for connecting said output port of said second valve to said liquid line of said second earth loop;

(q) means for connecting said equalization port of said second thermostatic expansion valve to said common suction line upstream of said accumulator;

(r) means for connecting said inlet port of said third heating thermostatic expansion valve to said outlet side of said fifth solenoid valve;

(s) means for connecting said inlet side of said fifth solenoid valve to said common liquid line downstream of said cooling fourth thermostatic expansion valve;

(t) means for connecting said outlet port of said third thermostatic expansion valve to said liquid line of said third earth loop;

(u) means for connecting said equalization port of said third thermostatic expansion valve to said common suction line upstream of said accumulator;

(v) means for placing said third controlling bulb of said third thermostatic expansion valve into thermal contact with said suction line of said third earth loop a short distance from the connection thereof to said refrigerant vapor header;

(w) means for connecting said inlet port of said fourth cooling thermostatic expansion valve to a liquid line of a refrigerant/air coil heat exchanger;

(x) means for connecting said outlet port of said fourth cooling thermostatic expansion valve to said first liquid line header of said first heating thermostatic expansion valve and to said fourth and fifth solenoid valves;

(y) means for connecting said equalizer line of said fourth cooling thermostatic expansion valve to said common suction line upstream of said accumulator;

(z) means for placing said fourth controller bulb of said fourth cooling thermostatic expansion valve into thermal contact with said refrigerant vapor line of said air/refrigerant heat exchanger coil a short distance from the outlet of said coil;

(aa) means for connecting a scavenging line to said main refrigerant vapor line upstream of said first and second solenoid valves 1 and 2 and for connecting individual earth loop vapor line connections of said first, second and third earth loops, to said inlet of said third solenoid valve;

(bb) means for connecting a line between said outlet of said third solenoid valve and said common suction line upstream of said accumulator;

(cc) a reversing valve having two inlets and two outlets;

(dd) a compressor having an inlet and an outlet, said outlet being connected to said hot gas inlet of said reversing valve;

(ee) an accumulator having an inlet and an outlet, said outlet being connected to said inlet of said compressor;

(ff) means for connecting said hot gas outlet of said reversing valve to said inlet of said refrigerant/air heat exchanger coil;

(gg) means for connecting said common suction outlet of said reversing valve to said inlet of said accumulator;

(hh) means for connecting said suction inlet of said reversing valve to said refrigerant vapor header downstream of all solenoid valves and individual earth loop vapor lines.

7. A method for operating said direct expansion valve heat pump system of claim 6 in said heating mode, said method comprising said steps of:

(a) initially providing all said solenoid valves in their normally open state;

(b) maintaining said fourth cooling thermostatic expansion valve fully open through connection of its equalizer tube to said common suction line upstream of the accumulator and through connection of its controlling bulb to said refrigerant vapor connection of said refrigerant/air heat exchanger coil which is hot in the heating mode;

(c) allowing liquid refrigerant to flow into said liquid line header directly to said first heating thermostatic expansion valve and through said fourth and fifth solenoid valves to said second and third heating thermostatic expansion valves respectively;

(d) allowing said first, second and third heating thermostatic expansion valves to meter liquid refrigerant down each of said first, second and third earth loops respectively, by virtue of a signal from the respective first, second and third controller bulbs;

(e) allowing vaporized refrigerant to flow in each of said first, second and third suction lines to said refrigerant vapor header, through open said first and second solenoid valves as required, through said reversing valve and thence to said accumulator and to said compressor;

(f) allowing compressed refrigerant gas to flow from said compressor through said reversing valve to said refrigerant/air heat exchanger coil; and (g) withdrawing liquid refrigerant from said refrigerant/air heat exchanger coil through a liquid outlet line towards said liquid line header.

8. A method of operating said direct expansion heat pump system of claim 6 in said cooling mode, said method comprising said steps of:

(I) in a first stage, the steps of:
  (a) initial activation by an electric signal from a room thermostat that said direct expansion heat pump has been placed in cooling mode;
  (b) closing said first, fourth and fifth solenoid valves;
  (c) opening said second and third solenoid;
  (d) closing said first refrigerant vapor header valve thereby allowing hot refrigerant vapor to enter only said first earth loop;
  (e) maintaining said first heating thermostatic expansion valve open by connection of its equalizer tube to said common suction line ahead of said accumulator and by connection of its controller bulb to said first vapor line of said first earth loop, said line being hot in the cooling mode;
  (f) passing hot compressed refrigerant from said outlet of said compressor outlet through said reversing valve and into said hot gas line which is downstream of said closed first solenoid valve;
  (g) allowing said heat pump to reject its heat to said ground at a pressure which is high enough to force liquid refrigerant through said liquid refrigerant line and through said first heating thermostatic expansion valve and on to said liquid line header which is connected to said inlet port of said fourth cooling thermostatic expansion valve;
  (h) closing said fourth and fifth liquid line solenoid valves, thereby preventing liquid refrigerant from entering the said second and third earth loops which are downstream of said fourth and fifth solenoid valves; evaporating and scavenging residual liquid refrigerant from said liquid refrigerant lines which are downstream of said first solenoid valve in said refrigerant vapor header through first, second and third solenoid valves to said accumulator and then to said compressor; allowing said fourth cooling thermostatic expansion valve to meter the correct amount of liquid refrigerant into said refrigerant/air heat exchanger coil by connection of the equalizer tube thereof to said common suction line ahead of said accumulator, and by connection of its controlling bulb thereof a short distance from said outlet of said refrigerant vapor outlet; and withdrawing warmed refrigerant gas from said refrigerant/air heat exchanger coil into said suction line and through said reversing valve into said accumulator and thence to said compressor suction inlet;

(II) in a second stage, the steps of:
  (a) activating all solenoid valves and individual loop connections to said header by means of a first pressure sensing device on said refrigerant vapor header until pressure reaches a predefined point which is sufficient to override an electric signal sent by a room thermostat and thereby to operate a relay which activates the first, second and third loop solenoid valves;
  (b) opening said first, third and fourth solenoid valves and closing said second and fifth solenoid valves;
  (c) opening said first solenoid valve and closing said second solenoid valve to allow hot gas to flow to said .first and second earth loops;
  (d) maintaining said first and second heating thermostatic expansion valves open by connection of the equalizer tubes thereof to said common suction line upstream of said accumulator and by connection of the controller bulbs thereof to said first and second vapor lines which are hot in said cooling mode;
  (e) passing hot compressed refrigerant from said compressor through said reversing valve and through said refrigerant vapor header into said hot gas lines which are upstream of said closed second solenoid valve;
  (f) allowing said heat pump to reject its heat to said ground at a pressure which is high enough to force liquid refrigerant through said first and second liquid refrigerant lines through said first and second heating thermostatic expansion valves and on said liquid line header connected to said inlet port of said fourth cooling thermostatic expansion valve;
  (g) closing said fifth liquid line solenoid valves, thereby preventing liquid refrigerant from entering said third loop which is downstream of said fifth solenoid valve 5;
  (h) evaporating and scavenging residual liquid refrigerant from said liquid refrigerant lines which are downstream of said second solenoid valve in said refrigerant vapor header, through said third solenoid valve to said accumulator and then to said compressor;
  (i) allowing said fourth cooling thermostatic expansion valve to meter the correct amount of liquid refrigerant into said refrigerant/air heat exchanger coil by virtue of the connection of the equalizer tube thereof to such common suction line upstream of said accumulator and by connection of the controlling bulb thereof a short distance from said refrigerant vapor outlet;
  (j) withdrawing warmed refrigerant gas from said refrigerant/air heat exchanger coil into said suction line and through said reversing valve into said accumulator and thence to said suction inlet of said compressor; and (III) in a third stage, the steps of:
  (a) activating all solenoid valves and individual loop connections to the header by a second pressure sensing device on said refrigerant vapor header, until the pressure reaches a predefined point which is sufficient to override an electric signal sent by a room thermostat and by said first pressure sensing device, and thereby to operate a relay which activates the loop solenoid valves;
  (b) allowing said first, second, fourth and fifth solenoid to be open while closing said third solenoid valve; opening said first and said second solenoid valves to allow hot gas to flow to said first, second and third earth loops;
  (c) maintaining said first, second and third heating thermostatic expansion valves open by connection of the equalizer tubes thereof to said common suction line ahead of said accumulator and by connection of the controller bulbs thereof to said first, second and third vapor lines of said first, second and third earth loops, said lines being hot in said cooling mode;

(d) passing hot compressed refrigerant from said outlet of said compressor through said reversing valve and through said refrigerant vapor header into said hot gas lines which are upstream of said closed solenoid valve;

(e) allowing said heat pump to reject its heat to said ground at a pressure which is high enough to force liquid refrigerant through said first, second and third liquid refrigerant lines through said first, second and third heating thermostatic expansion valves and through said open fourth and fifth solenoid valves and on to said liquid line header which is connected to said inlet port of said fourth cooling thermostatic expansion valve;

(f) allowing said fourth cooling thermostatic expansion valve to meter the correct amount of liquid refrigerant into said refrigerant/air heat exchanger coil by connection of the equalizer tube thereof to said common suction line ahead of said accumulator and by connection of the controlling bulb thereof a short distance from said outlet of said refrigerant vapor; and (g) withdrawing warmed refrigerant gas from said refrigerant/air heat exchanger coil into said suction line and through said reversing valve into said accumulator and thence to said compressor suction inlet.

* * * * *

UNITED STATES PATENT AND TRADEMARK OFFICE
CERTIFICATE OF CORRECTION

PATENT NO. : 5,388,419

DATED : February 14, 1995

INVENTOR(S) : Glen A. Kaye

It is certified that error appears in the above-indentified patent and that said Letters Patent is hereby corrected as shown below:

The title page, showing an illustrative figure, should be deleted and substitute therefor the attached title page.

Delete Drawing Sheets 1-9, and substitute therefor the Drawing Sheets consisting of FIGS. 1-10, as shown on the attached pages.

United States Patent [19]
Kaye

[11] Patent Number: 5,388,419
[45] Date of Patent: Feb. 14, 1995

[54] STAGED COOLING DIRECT EXPANSION GEOTHERMAL HEAT PUMP

[75] Inventor: Glen A. Kaye, Petitcodiac, Canada

[73] Assignee: Maritime Geothermal Ltd., New Brunswick, Canada

[21] Appl. No.: 139,200

[22] Filed: Oct. 20, 1993

Related U.S. Application Data

[63] Continuation-in-part of Ser. No. 53,050, Apr. 23, 1993, Pat. No. 5,313,804.

[51] Int. Cl.$^6$ ............................................. F25B 13/00
[52] U.S. Cl. ........................................ 62/160; 62/196.4; 62/200; 62/260; 62/238.7; 62/324.6; 165/45
[58] Field of Search ............... 62/160, 199, 200, 260, 62/238.6, 238.7, 196.1, 196.3, 196.4, 197, 324.1, 324.6, 224, 225, 210, 212, 222; 165/45

[56] References Cited

U.S. PATENT DOCUMENTS

| | | | |
|---|---|---|---|
| 4,327,560 | 5/1982 | Leon et al. | 62/324.1 X |
| 4,753,285 | 6/1988 | Rawlings | 62/260 X |
| 4,878,357 | 11/1989 | Sekigami et al. | 62/160 |
| 4,920,757 | 5/1990 | Gazes et al. | 62/260 X |
| 5,025,634 | 6/1991 | Dressler | 62/238.6 X |
| 5,038,580 | 8/1991 | Hart | 62/324.6 |
| 5,136,855 | 8/1992 | Lenarduzzi | 62/260 X |

Primary Examiner—Harry B. Tanner
Attorney, Agent, or Firm—Eckert Seamans Cherin & Mellott

[57] ABSTRACT

A "DX" heat pump is provided herein which is based on the principle of providing optimal heat exchange in the heating mode through three parallel ground loops, two of which can be cut off from the system and evacuated of refrigerant in the cooling mode. The loops are designed in terms of volume so that the refrigerant charge is correct in the heating mode when split in three loops and also correct in the cooling mode when only one loop is used, but it contains the full system refrigerant charge. The loops are provided with "TX" metering valves which can be individually operated to provide a staged cooling system.

8 Claims, 9 Drawing Sheets

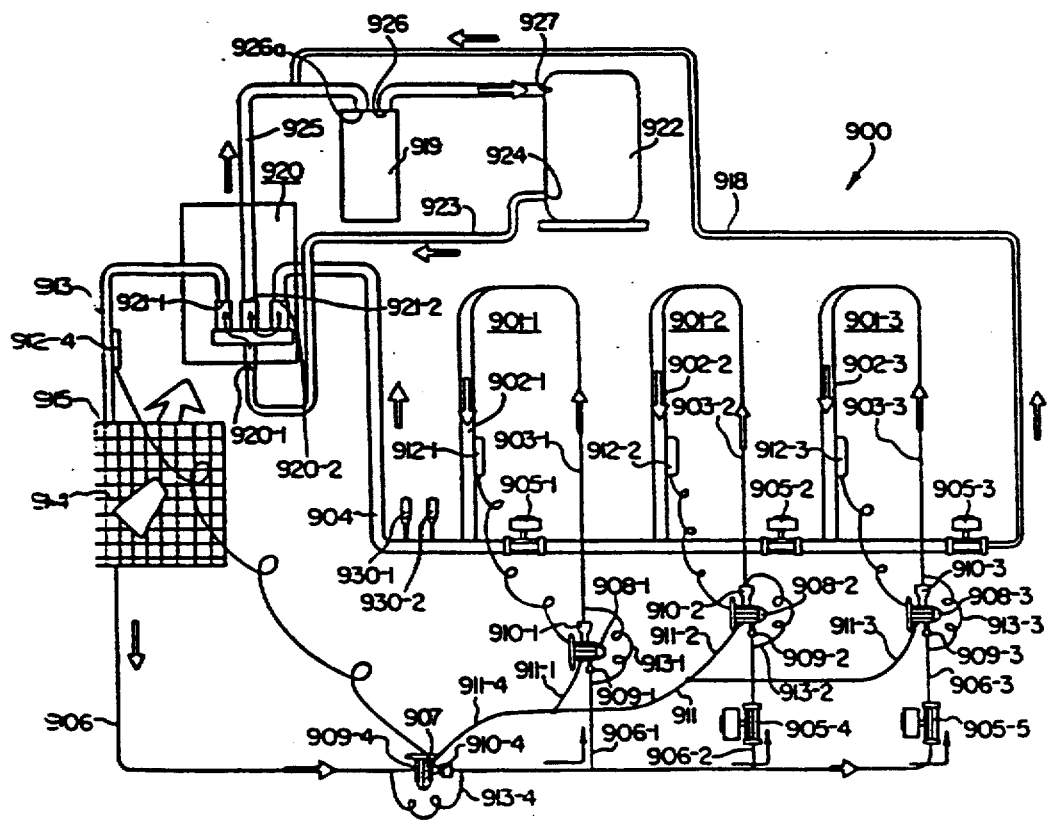

UNITED STATES PATENT AND TRADEMARK OFFICE
CERTIFICATE OF CORRECTION

PATENT NO. : 5,388,419
DATED : February 14, 1995
INVENTOR(S) : Glenn A. Kaye

It is certified that error appears in the above-indentified patent and that said Letters Patent is hereby corrected as shown below:

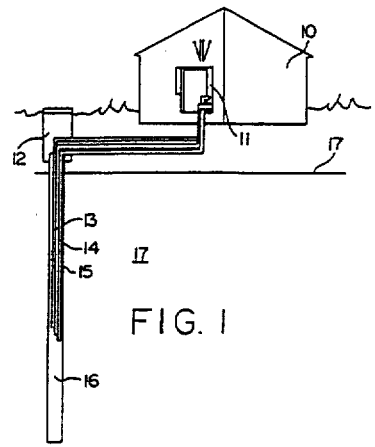

FIG. 1

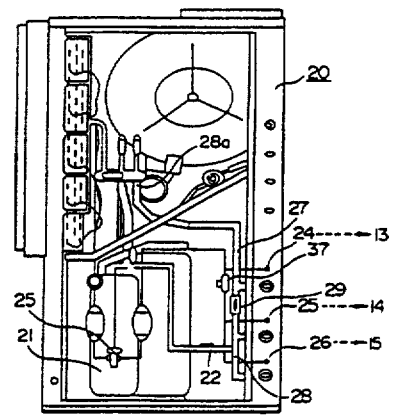

FIG. 2

UNITED STATES PATENT AND TRADEMARK OFFICE
CERTIFICATE OF CORRECTION

PATENT NO. : 5,388,419

DATED : February 14, 1995

INVENTOR(S) : Glenn A. Kaye

It is certified that error appears in the above-indentified patent and that said Letters Patent is hereby corrected as shown below:

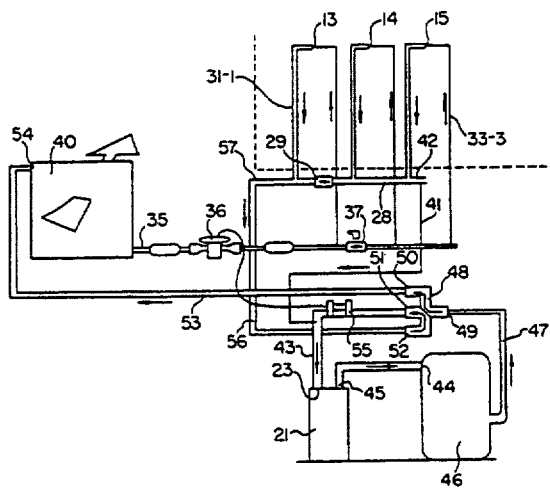

FIG. 3

UNITED STATES PATENT AND TRADEMARK OFFICE
CERTIFICATE OF CORRECTION

PATENT NO. : 5,388,419
DATED : February 14, 1995
INVENTOR(S) : Glenn A. Kaye

It is certified that error appears in the above-indentified patent and that said Letters Patent is hereby corrected as shown below:

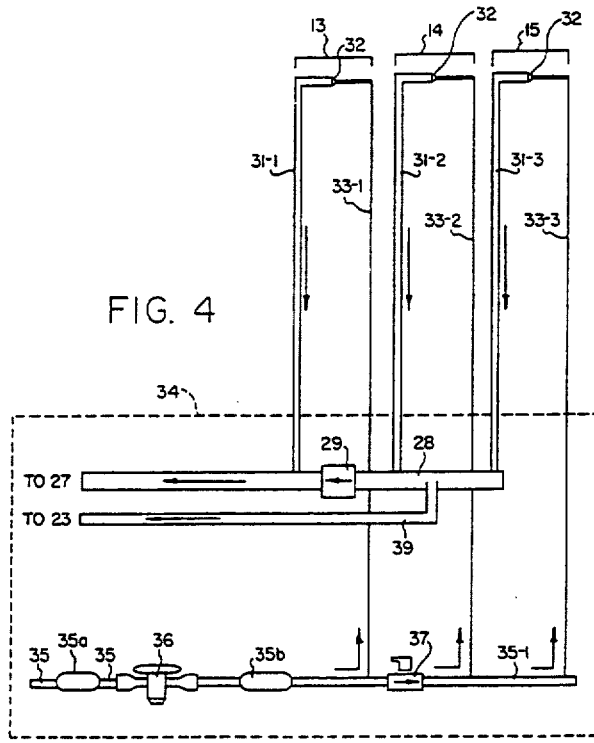

FIG. 4

UNITED STATES PATENT AND TRADEMARK OFFICE
CERTIFICATE OF CORRECTION

PATENT NO. : 5,388,419　　　　　　　　　　　Page 6 of 12
DATED : February 14, 1995
INVENTOR(S) : Glenn A. Kaye It is certified that error appears in the above-indentified patent and that said Letters Patent is hereby corrected as shown below:

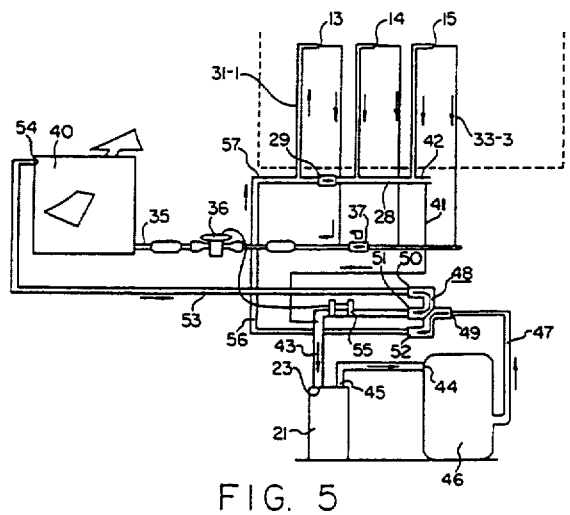

FIG. 5

UNITED STATES PATENT AND TRADEMARK OFFICE
CERTIFICATE OF CORRECTION

PATENT NO. : 5,388,419  Page 7 of 12
DATED : February 14, 1995
INVENTOR(S) : Glenn A. Kaye It is certified that error appears in the above-indentified patent and that said Letters Patent is hereby corrected as shown below:

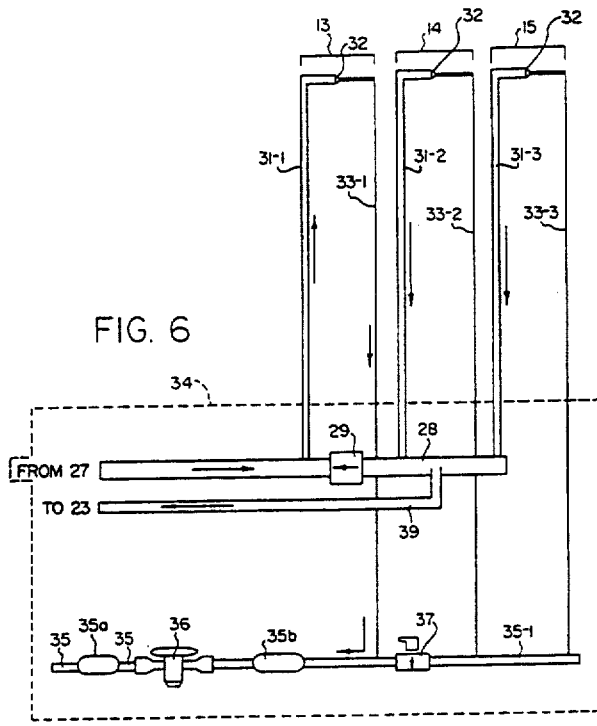

FIG. 6

UNITED STATES PATENT AND TRADEMARK OFFICE
CERTIFICATE OF CORRECTION

PATENT NO. : 5,388,419  Page 8 of 12
DATED : February 14, 1995
INVENTOR(S) : Glenn A. Kaye It is certified that error appears in the above-indentified patent and that said Letters Patent is hereby corrected as shown below:

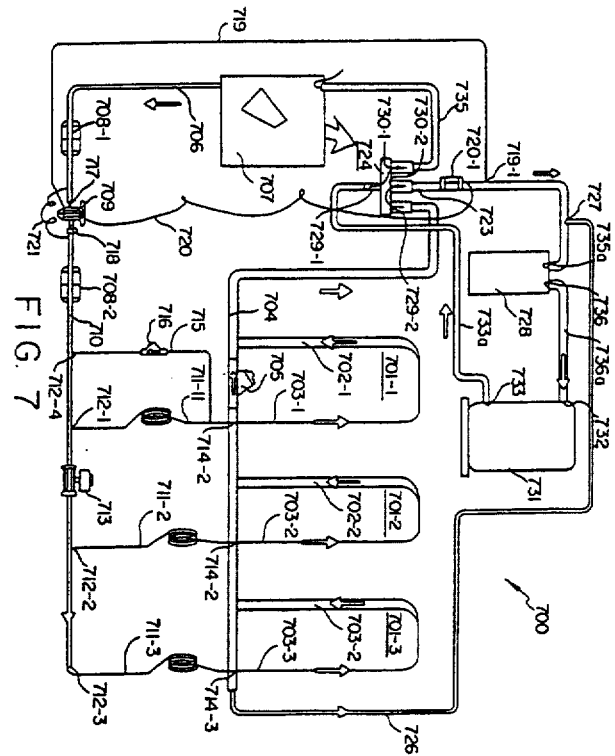

FIG. 7

UNITED STATES PATENT AND TRADEMARK OFFICE
CERTIFICATE OF CORRECTION

PATENT NO. : 5,388,419                    Page 9 of 12

DATED : February 14, 1995

INVENTOR(S) : Glenn A. Kaye

It is certified that error appears in the above-indentified patent and that said Letters Patent is hereby corrected as shown below:

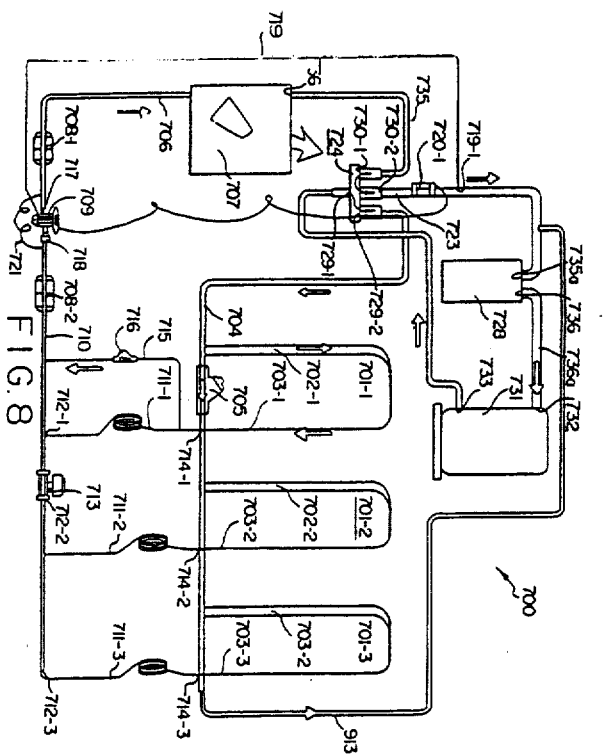

UNITED STATES PATENT AND TRADEMARK OFFICE
CERTIFICATE OF CORRECTION

PATENT NO. : 5,388,419
DATED : February 14, 1995
INVENTOR(S) : Glenn A. Kaye

Page 10 of 12

It is certified that error appears in the above-indentified patent and that said Letters Patent is hereby corrected as shown below:

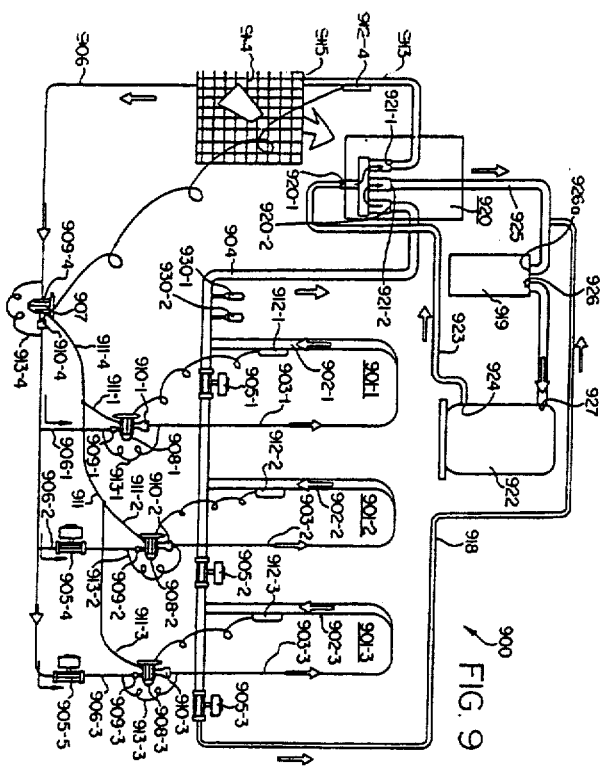

FIG. 9

UNITED STATES PATENT AND TRADEMARK OFFICE
CERTIFICATE OF CORRECTION

PATENT NO. : 5,388,419

DATED : February 14, 1995

INVENTOR(S) : Glenn A. Kaye

It is certified that error appears in the above-indentified patent and that said Letters Patent is hereby corrected as shown below:

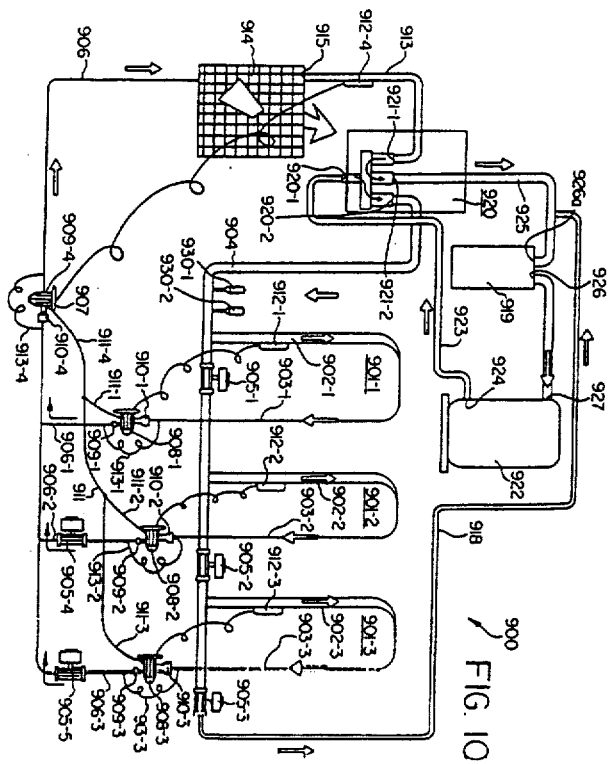

UNITED STATES PATENT AND TRADEMARK OFFICE
CERTIFICATE OF CORRECTION

PATENT NO. : 5,388,419
DATED : February 14, 1995
INVENTOR(S) : Glenn A. Kaye

It is certified that error appears in the above-indentified patent and that said Letters Patent is hereby corrected as shown below:

On title page, item [75],
The inventor's name is correctly spelled Glenn A. Kaye.

In Column 13, line 34, delete "got" and insert therefor —hot—.

In Column 13, line 45, delete "it" and insert therefor —its—.

In Column 22, line 43, delete "9082" and insert therefor —908-2,—.

In Column 26, line 26, delete "902-2." and insert therefor —902-2,—.

In Claim 1, column 28, line 35, delete "an" and insert therefor —and—.

In Claim 6, column 29, line 36, delete "connect&rig" and insert therefor —connecting—.

In Claim 8, column 32, line 8, delete ".first" and insert therefor —first—.

Signed and Sealed this

Twenty-sixth Day of March, 1996

Attest:

BRUCE LEHMAN

*Attesting Officer*   *Commissioner of Patents and Trademarks*